(12) United States Patent
Mizrachi

(10) Patent No.: US 8,403,757 B2
(45) Date of Patent: Mar. 26, 2013

(54) METHOD AND APPARATUS FOR PROVIDING GAMING SERVICES AND FOR HANDLING VIDEO CONTENT

(76) Inventor: Yosef Mizrachi, Alfey Menashe (IL)

( * ) Notice: Subject to any disclaimer, the term of this patent is extended or adjusted under 35 U.S.C. 154(b) by 437 days.

(21) Appl. No.: 12/296,306

(22) PCT Filed: Apr. 15, 2007

(86) PCT No.: PCT/IL2007/000476
§ 371 (c)(1),
(2), (4) Date: Oct. 7, 2008

(87) PCT Pub. No.: WO2007/119236
PCT Pub. Date: Oct. 25, 2007

(65) Prior Publication Data
US 2011/0263332 A1    Oct. 27, 2011

Related U.S. Application Data

(60) Provisional application No. 60/825,588, filed on Sep. 14, 2006, provisional application No. 60/791,467, filed on Apr. 13, 2006.

(51) Int. Cl.
*A63F 9/24* (2006.01)
(52) U.S. Cl. .......................................................... 463/42
(58) Field of Classification Search ..................... 463/42
See application file for complete search history.

(56) References Cited

U.S. PATENT DOCUMENTS
2003/0177187 A1    9/2003    Levine et al.

FOREIGN PATENT DOCUMENTS
WO    WO2006/100664    9/2006

*Primary Examiner* — Omkar Deodhar
(74) *Attorney, Agent, or Firm* — Mark M. Friedman

(57) ABSTRACT

The present invention relates to systems and apparatus for providing gaming services (for example, gaming services provided via a computer network) and to systems and apparatus for encoding and/or transmitting and/or decoding electronic video content. Some presently disclosed techniques may be particularly useful for reducing and/or eliminating gaming latency.

7 Claims, 30 Drawing Sheets

Examples Where $P_2$ Includes At Least One 'Extra'
Command Not in $F_1$ (Extra Command In Bold; Underline)

| $F_1$ | $P_2$ |
|---|---|
| Example 1: C(1), C(2) | C(1);C(2);_C(3)_ |
| Example 2: C(1), C(2) | C(1);C(2);_C(2)_ |
| Example 3: C(1), C(3) | C(1);_C(2)_ |
| Example 4: C(1), C(3) | C(1);_C(1)_ |

FIG. 7C

Sample Frame Sequence 1502

$F_1[I_A]$; $F_2[I_B]$; $F_3[I_C]$; $F_4[I_D]$;

$F_5[P^1_A(F_1), P^1_B(F_2), P^1_C(F_3), P^1_D(F_4)]$;

$F_6[P^2_A(F_1), P^2_B(F_2), P^2_C(F_3), P^2_D(F_4)]$;

$F_6[P^3_A(F_1), P^3_B(F_2), P^3_C(F_3), P^3_D(F_4)]$;

$F_7[I_A]$;

$F_8[I_B]$;

$F_9[I_C]$;

$F_{10}[I_D]$;

$F_{11}[P^1_A(F_7), P^1_B(F_8), P^1_C(F_9), P^1_D(F_{10})]$;

$F_{12}[P^2_A(F_7), P^2_B(F_8), P^2_C(F_9), P^2_D(F_{10})]$;

• • •

Uninterrupted Consecutive Sequence 1506 of P Frames; Uninterrupted Consecutive Sequence of Non-I frames All P frames are generationally homogeneous

FIG. 13C

| Hybrid Frame – F[$I_A$;$P_D$] | |
|---|---|
| I frame at Region A 852 | Dormant |
| Dormant | P frame relative to F[$I_D$] in Region D 864 |

Hybrid Frame – F[$I_A$; $P_B$; $P_C$;$P_D$] - co-resident P frames may be encoded either:

| | |
|---|---|
| I frame at Region A 852 | P frame relative to F[$I_B$] in Region B 856 |
| P frame relative to F[$I_C$] in Region C 860 | P frame relative to F[$I_D$] in Region D 864 |

Division can Be static and/or Dynamic (dynamic – for example, A preferred target Gets more I frame coverage)

1) Relative to spatially partial I frames that are siblings; and/or
2) Relative to spatially partial I frames that are NOT siblings

FIG. 14A

Generate $F_1$ 1570 by encoding $Inp_1$ 1670;

Generate $F_2$ 1574 by encoding $Inp_2$ 1674;

Generate $F_3$ 1578 by encoding $Inp_3$ 1678;

Generate $F_4$ 1582 by encoding $Inp_4$ 1682;

Generate $F_5$ 1584 by encoding $Inp_5$ 1684;

Generate $F_6$ 1588 by encoding $Inp_6$ 1688;

Generate $F_7$ 1592 by encoding $Inp_7$ 1692;

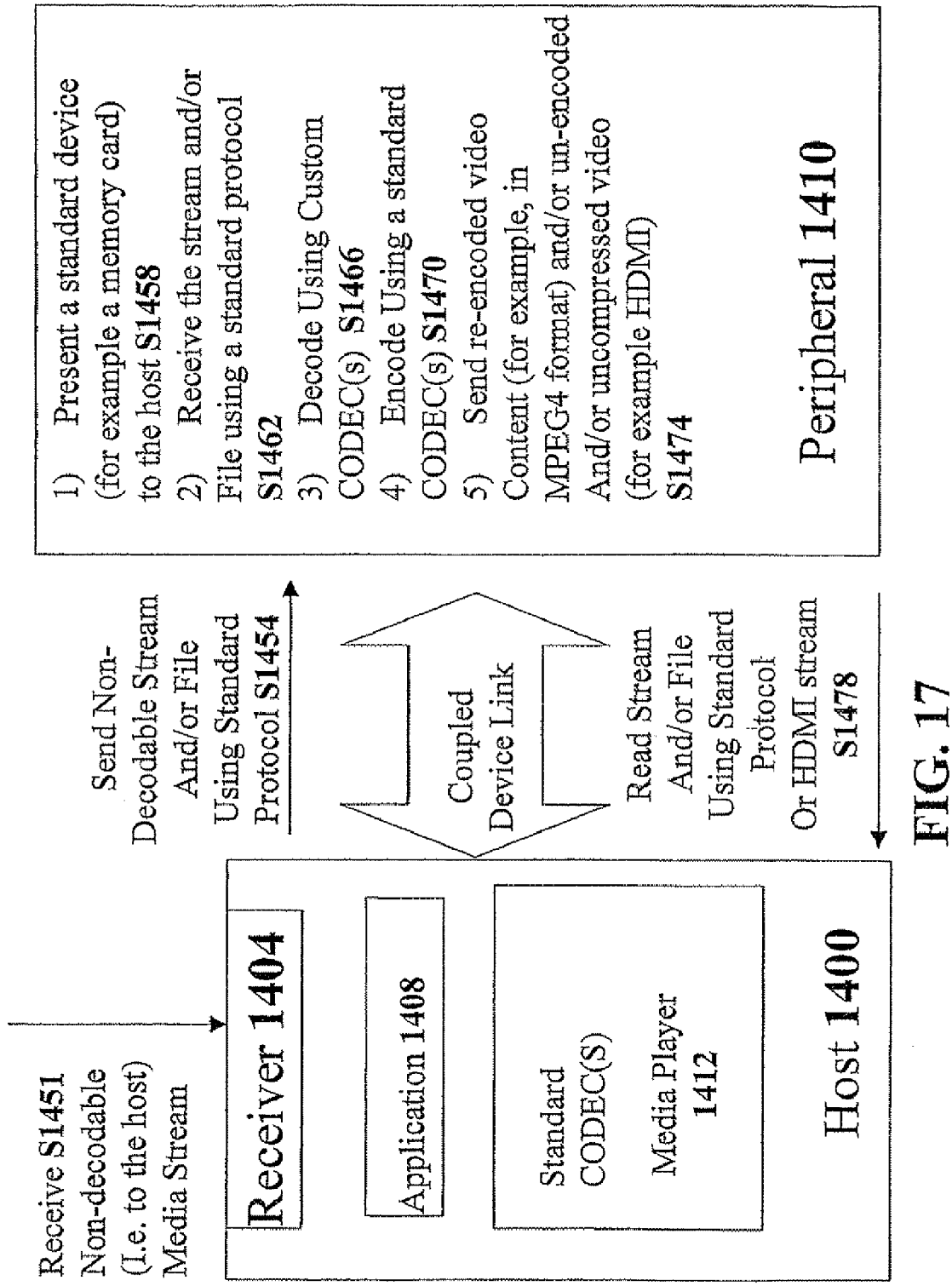

METHOD AND APPARATUS FOR PROVIDING GAMING SERVICES AND FOR HANDLING VIDEO CONTENT

RELATED APPLICATIONS

This patent application is a U.S. National Phase Application of PCT/IL2007/000476 filed on Apr. 15, 2007, and also claims the benefit under 119(e) of U.S. Provisional Patent Application No. 60/791,467 filed Apr. 13, 2006, and also claims the benefit under 119(e) of U.S. Provisional Patent Application No. 60/825,588 filed Sep. 14, 2006.

FIELD OF THE INVENTION

The present invention relates to systems and apparatus for providing gaming services (for example, gaming services provided via a computer network) and to systems and apparatus for encoding and/or transmitting and/or decoding electronic video content. Some presently disclosed techniques may be particularly useful for reducing and/or eliminating gaming latency.

BACKGROUND AND RELATED ART

WO/2006/100664, of the present inventor, discloses systems, methods and computer readable code for providing a single player and/or a multi-player gaming environment. Each user is provided with a client device having an input module and display screen. An application server array receives data indicative of game commands from each client device. Residing in the application server array is a game engine which maintains a virtual gaming universe including one or more of user-controllable gaming characters. The gaming engine is operative to associate each user-controlled gaming character with game commands received from a respective client device of the plurality of devices. At the application server array, one or more streams of videos are rendered. In some embodiments, each video stream represents a view associated with a different game character. Each video stream is sent over a communications link to a respective client device. In some embodiments, the communications link is a switched network, such as a packet switched network of a circuit switched network.

It is noted that the WO/2006/100664 is incorporated into the present disclosure by reference in its entirety. Citation of the aforementioned reference (or any reference) does not constitute an admission that the cited reference is prior art.

The present disclosure relates to improved systems and methods for providing gaming services and to improved techniques for encoding and/or transmitting and/or decoding video. It is noted that although the presently disclosed teachings are applicable to the systems described in WO/2006/100664, this should not be construed as a limitation, and it is noted that the presently disclosed teachings are applicable in a variety of systems including those not described in WO/2006/100664.

It is noted that when implementing a system where (i) a gaming engine for multi-player game resides on the server-side; and (ii) video content descriptive of the virtual gaming universe is rendered on the server side and streamed to client devices, it may be desirable to address one or more of the flowing issues: (i) game latency; (ii) game fairness issues in a system where server-client game latency may be present; (iii) video streaming, for example, via a wide-area network; (iv) rendering video appropriate for different client devices each having different device parameters; (v) general issues related to improving the gaming experience; (vi) jitter related to variations in latency.

Game Latency

There is an ongoing need for reducing server-client latency in systems where video is rendered at the server side and/or a view of a virtual world is generated at a server side.

In the example of FIG. 1, a game engine generates a snapshot $S(t_0)$ (either rendered or unrendered) of a virtual gaming universe for a given time (for example, $t_0$) and sends this snapshot to a client device (for example, a mobile telephone or a personal computer or any other device having video display functionality). Unfortunately, due to client latency, this snapshot is not immediately displayed to the user—rather, the snapshot generated at 'real' time $t^r_0$ is only displayed at a later time $t^r_1$ due to 'game latency.' In particular, it is noted that 'game latency' may come from one or more of a number of sources, including but not limited to (i) game-engine latency associated with computing the updated state (s) of the virtual world or universe; (ii) rendering latency associated with rendering a particular view of the updated virtual world or universe (iii) encoding latency associated with encoding the rendered video (iv) network latency associated with streaming the encoded video from the server-side to a given client device.

In the example of FIG. 1, the latency is the difference between $t^r_1$ and $t^r_0$.

Thus, a greater game latency may, in some situations, provide for a less responsive gaming experience. Even worse, in some situations, the game latency may adversely influence 'game fairness' as will be explained in the next paragraph with reference to a particular example.

In this example, two gaming characters are fighting each other to the death. Each gaming character is controlled by a respective user client device which sends commands—whichever client device can react to a situation within the gaming universe faster will enjoy an unfair advantage.

In this example, the network latency may vary among different client devices, and some client devices may experience very different latency than other client devices. In this example, the game server is located in Tel Aviv Israel and client devices are located in Haifa, Israel and Boston, Mass. According to this example, an updated description of a virtual world (for example, a next 'frame') arrives at the Haifa-based client device hundreds of milliseconds before the same description arrives at the Boston-based device. In this example, the Haifa-based client is thus allowed to react to the updated situation in the virtual universe at an earlier time, giving the user of the Haifa-based client device an unfair advantage. Thus there is an ongoing need for minimizing game latency associated with multi-player gaming systems (for example, provided in a wide-area network) and for handling fairness issues associated with differential client latency.

There is an ongoing need to for apparatus and techniques which minimize the latency and thus provide a more realistic and responsive gaming experience.

There is an ongoing need to for apparatus and techniques which allow for handling of game latency in a manner that provides more 'game fairness.'

Multi-User Games Provided Using Different Types of Client Devices

One feature disclosed in certain embodiments of WO/2006/100664 is rendering of views of a virtual gaming universe on the 'server side.'

To date, most multi-player and many single-play games are marketed as 'multi-platform' games where the user can play the game from a plurality of platforms. In one example, this allows the game to be played, for example, using different types of PDAs or cellphones. For example, some users among a user population operate more "sophisticated" client devices (PCs, 'advanced' cellphones, PDAs). These users expect a "richer" gaming experience that utilizes the graphics and/or sound capability of the client device—for example, a game that displays more and richer landscape features (or more features of certain game objects, or displayers a game object or landscape feature with greater contrast), that utilizes a higher device screen refresh rate for a "smoother" experience, etc. Other users operate more "primitive" client devices and require game software that is less resources-intense (e.g. graphics resources, display resources). In another example, a single user may want to play a given game using his PDA when "on the road" and using his desktop computer when in the "office." This user expects a richer gaming experience using the desktop computer.

Unfortunately, development of multi-platform multi-player or single-player games is extremely expensive. The game must be "tweaked" for each platform. Thus, in one example, certain objects, which might be important for conducting the game, are not displayed on a less-sophisticated display device, and developers must develop, debug and maintain a version of the game software that does not display these objects, or that displays the objects with less contrast.

It would be highly desirable to have systems and methods that facilitate porting of single player and/or multiplayer games between multiple display platforms and/or multiple devices without loosing critical graphical details in the various views.

The present inventor has discovered that certain features of the system and method in WO/2006/100664 may be adapted for providing a technique or providing multi-user Techniques for Handling Encoded Video The MPEG-2 Draft Standard provides temporal redundancy reduction through the use of various predictive and interpolative tools. In many systems, three types of frames or pictures are used: "I" Intrapictures, "P" Predicted Pictures, and "B" Bidirectional Interpolated Pictures.

The "I" Intrapictures provide moderate compression, and are access points for random access, e.g., in the case of video tapes or CD ROMS. As a matter of convenience, one "I" Intrapicture is provided approximately every half second. The "I" Intrapicture only gets information from itself. It does not receive information from a "P" Predicted Picture or "B" Bidirectional Interpolated Picture. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

Motion compensation goes to the redundancy between pictures. The formation of "P" Predicted Pictures from "I" Intrapictures and of "B" Bidirectional Coded Pictures from a pair of past and future pictures is a key feature of the MPEG-2 Draft Standard technique.

Thus, typically these pictures are sent to a display device as a sequence, wherein after sending a single I picture, a number of B or P pictures may be sent. Typically, the I pictures are sent periodically to provide a "refresh."

The present inventor has noticed that there are some situations where the aforementioned scheme for encoding and decoding video content may not be optimal. Some situations relate to certain implementations of certain systems described in WO/2006/100664, though this is not to be construed as a limitation to any currently-disclosed technique, and is not to be construed as a limitation to any technique disclosed in WO/2006/100664.

There is an ongoing need for improved techniques for encoding and/or decoding electronic video content.

SUMMARY OF THE INVENTION

It is now disclosed for the first time a server-based system for providing gaming services, the system comprising:
 a) an application server array 110 adapted to receive, from at least one client device 112, data 118 indicative of game commands; and
 b) a game engine 312 residing at least in part on said application server array 110 for maintaining a virtual gaming universe including at least one user-controllable gaming character 816, said gaming engine operative to associate a given said gaming character 816 with game commands of a given said client device 112, said game engine 312 being operative to generate snapshots of said virtual gaming universe,
 said game engine 312 being operative to:
  i) derive, from a first said snapshot 2100 associated with a first game time $t^g_0$ 2102 and a first game command set $c_1$ 2104, a second snapshot 2200 associated with a second game time $t^g_1$ 2202 and a second game command set $c''_1$ 2204; and
  ii) derive, from said first snapshot 2100, a third snapshot 2110 associated with a third game time $t^g_2$ 2122 and a third game command set $c_2$ 2214,
 wherein:
  i) $(t^g_2 - t^g_0) <= (t^g_1 - t^g_0)$;
  ii) said third game command set $c_2$ 2114 includes at least one extra game command relative to said second game command set $c_1$ 2104;
  iii) said game engine is operative such that said deriving of said second snapshot 2200 includes:
   A) predicting a future state 816B of said given user-controllable gaming character 816 for said second game time $t^g_1$2202, said future state 816B being different from a current state 816A of said given user-controllable gaming character;
   B) predicting a future state 810B of at least one object 810 in said virtual gaming universe other than said given user-controllable gaming character 816 for said second game time $t^g_1$2202;
   C) computing a relationship between said predicted future states 816B and 810B.

According to some embodiments, the system further comprises:
 c) a data streamer operative to send said second snapshot to said client device associated with said gaming character.

According to some embodiments, said third snapshot contradicts said second snapshot according to game logic of said game engine 312, and said game data streamer is further operative, after said sending of said second snapshot to said client device, to send to a derivative of said contradictory said third snapshot to said client device 112.

According to some embodiments, said game engine 312 is operative to associate each said 112 client device of a plurality of client devices with a respective said gaming character, and to derive, for said respective gaming character, a respective said second snapshot from said first snapshot.

According to some embodiments, the system further comprises:
c) a data streamer operative to send to said each client device 112, said second respective snapshot associated with said respective gaming character.

According to some embodiments, said third snapshot contradicts said respective second snapshot according to game logic of said game engine 312, and said game data streamer is further operative, after said sending of said second snapshot to said client device, to send to a derivative of said contradictory said third snapshot to said client device 112.

According to some embodiments, the system further comprises:
c) a data streamer operative to send said second snapshot to said client device associated with said gaming character associated with an indication of a latency-based display delay, said latency-based display delay derived from an assessed latency of said client device.

According to some embodiments, the system further comprises:
c) a transmission delay engine 348,
wherein said data streamer and said 352 and said transmission delay engine 348 are operative to delay transmission of said second snapshot in accordance with an assessed latency of According to some embodiments, said transmission delay engine 348 is operative to differential delay transmission a first delay time for a first said client device having a first assessed latency and a second delay time different from said first delay time for a second client device having a second assessed latency different from said first said assessed latency.

According to some embodiments, said predicted future state of said controllable gaming character includes at least one of
i) a predicted future position of said controllable gaming character at time $t^g_1$ that is different than a position of said controllable gaming character at time $t^g_0$;
ii) a predicted orientation of said controllable gaming character at time $t^g_1$ that is different than an orientation of said controllable gaming character at time $t^g_0$.

According to some embodiments, said predicted future state 810B of said object 810 includes at least one of:
i) a predicted future position of said object 810B at time $t^g_1$ that is different than a position of said object at time $t^g_0$;
ii) a predicted orientation of said object at time $t^g_1$ that is different than an orientation 810A of object at time $t^g_0$.

According to some embodiments, said object is a gaming character other than said gaming character.

According to some embodiments, said other gaming character is a user controllable gaming character controllable by a client device 112 other than said given client device.

According to some embodiments, said object is other than a gaming character.

According to some embodiments, said application server array 110 is operative such that at least one of:
a) $(t^g_2 - t^g_0)$; and
b) $(t^g_1 - t^g_0)$ is determined in accordance with any combination of:
i) an assessed latency of said given client device;
ii) an assessed latency of a client device other than said given client device;

It is now disclosed for the first time a method for providing gaming services, the method comprising:
a) receiving, at an application server array 110 from at least one client device 112, data 118 indicative of game commands; and
b) maintaining, on said application server array 110, a virtual gaming universe including at least one user-controllable gaming character 816 such that a given said gaming character 816 is associated with game commands of a given said client device 112; and
c) generating snapshots of said virtual universe, wherein said generating includes:
i) deriving, from a first said snapshot 2100 associated with a first game time $t^g_0$ 2102 and a first game command set $c_1$ 2104, a second snapshot 2200 associated with a second game time $t^g_1$ 2202 and a second game command set $c'_1$ 2204; and
ii) deriving, from said first snapshot 2100, a third snapshot 2110 associated with a third game time $t^g_2$ 2112 and a third game command set $c_2$ 2114,
wherein:
i) $(t^g_2 - t^g_0) <= (t^g_1 - t^g_0)$;
ii) said third game command set $c_2$ 2114 includes at least one extra game command relative to said second game command set $c'_1$ 2204;
iii) said game engine is operative such that said deriving of said second snapshot 2200 includes:
A) predicting a future state 816B of said given user-controllable gaming character 816 for said second game time $t^g_1$ 2202, said future state 816B being different from a current state 816A of said given user-controllable gaming character;
B) predicting a future state 810B of at least one object 810 in said virtual gaming universe other than said given user-controllable gaming character 816 for said second game time $t^g_1$ 2202; and
C) computing a relationship between said predicted future states 816B and 810B.

It is now disclosed for the first time a server-based system for providing gaming services, the system comprising:
a) an application server array 110 adapted to receive, from at least one client device 112, data 118 indicative of game commands; and
b) a game engine 312 residing at least in part on said application server array 110 for maintaining a virtual gaming universe, said game engine 312 being operative to generate snapshots of said virtual gaming universe, said game engine 312 being operative to derive, from a first said snapshot 2100 associated with a first game time $t^g_0$ 2102, a second snapshot 2200 associated with a second game time,
wherein a relationship between said second game time $t^g_1$ 2202 and said first game time $t^g_0$ 2102 is determined, at least in part, in accordance with an assessed server-client latency of at least one said client device.

It is now disclosed for the first time a method for providing gaming services, the method comprising:
a) receiving, at an application server array 110 from at least one client device 112, data 118 indicative of game commands; and
b) maintaining, on said application server array 110, a virtual gaming universe;
c) assessing a client-server latency of at least one said client device;
d) generating snapshots of said virtual universe in accordance with said assessed client-server latency, wherein said generating includes:
i) deriving, from a first said snapshot 2100 associated with a first game time $t^g_0$ 2102, a second snapshot 2200 associated with a second game time, wherein a relationship between said second game time $t^g{}_1$ 2202 and said first game time $t^g{}_0$ 2102 is determined, at least in part, in accordance with said assessed server-client latency.

It is now disclosed for the first time a method of video frame generation comprising:

a) generating a plurality of video frame including a first video frame 1574 that is a hybrid video frame that includes an I frame portion 1583 and a P frame portion 1581.

According to some embodiments,
 i) said generating of said plurality of video frames includes generating a second video frame 1578 different from said first video frame 1574; and
 ii) said second video frame includes:
  i) a first P frame portion 1571 encoded relative to said I frame portion 1583; and
  ii) a second I frame portion 1573 encoded relative to said P frame portion 1581,
 wherein said second video frame is a generationally inhomogeneous video frame such that a P-generationality of said first P frame portion 1571 is different from a P-generationally of said second P frame portion 1573.

It is now disclosed for the first time a method of video frame generation comprising:

a) generating a plurality of video frames including:
 i) a first frame 1570 that is at least partially spatially an I frame;
 ii) a second frame 1578 that is generationally inhomogeneous and includes:
  A) a first P-frame portion 1571 that:
   i) is encoded relative to an I frame portion of said first frame 1570;
   ii) has a P-generationality equal a first number; and
  B) a second P-frame portion 1573 whose P-generationality is a second number different from said first number.

According to some embodiments, said generating of said plurality of video frame includes:

b) generating a third frame 1574 that is a hybrid frame including an I frame portion 1583 and a P frame portion 1581, wherein:
 A) said first P-frame portion 1571 of said second frame 1578 is also encoded relative to said P frame portion 1581 of said third frame 1574
 B) said second P-frame portion 1573 of said second frame 1578 is encoded relative to said I frame portion 1583 of said third frame.

It is now disclosed for the first time a method of video frame generation comprising:

a) generating a plurality of video frames including:
 i) a first frame 1570 that is at least partially spatially an I frame;
 ii) a second frame 1574 that includes:
  A) a P frame portion 1581 encoded relative to a portion of said first frame 1570; and
  B) a I frame portion 1583; and
 iii) a third frame 1578 that includes:
  A) a first P frame portion 1571 encoded relative to said P frame portion 1581 of said second frame and to said portion of said first frame 1570; and
  B) a second P frame portion 1573 encoded relative to said I frame portion 1583 of said second frame.

It is now disclosed for the first time a method of video frame generation from an ordered plurality of input frames including a first input frame 1674 and a second input frame 1678 different from the first input frame, the method comprising:

a) generating, from the ordered plurality of input frame, a plurality of encoded video frames including an uninterrupted sequence (1570, 1574, 1578, 1582, 1584) of frames that are at least partially I frames, wherein said generating includes:
 a) encoding a first input frame 1674 into a first encoded frame 1574 of said uninterrupted sequence, said first encoded frame 1574 being at least partially spatially a I frame and including an I frame portion 1583 derived from said first input frame 1674;
 b) encoding a second input frame 1678 different from the first input frame 1674 into a second encoded frame 1578 of said uninterrupted sequence, said second encoded frame 1578 being at least partially spatially a I frame and including an I frame portion 1569 derived from said second input frame 1678.

It is now disclosed for the first time a method of video frame generation comprising:

a) generating a plurality of video frame including:
 i) a first at least partially P frame 1578 including:
  A) a first P frame portion 1571; and
  B) a second P frame portion 1573; and
 ii) a second at least partially P frame 1584 different from said first at least partially P frame 1578 including:
  A) a first P frame portion 1575; and
  B) a second P frame portion 1577,
 wherein:
  i) said first P frame portion 1571 of said first at least partially P frame 1578 and said first P frame portion 1575 of said second at least partially P frame 1584 share an I frame parent 1570;
  ii) said second P frame portion 1573 of said first at least partially P frame 1578 and second P frame portion 1577 of said second at least partially P frame 1584 have different I frame parents (1574 and 1582).

It is now disclosed for the first time a method of video frame generation comprising:

a) generating an ordered plurality of video frames having an ordering, said generating including:
 i) a first at least partially P frame 1578 including:
  A) a first P frame portion 1571; and
  B) a second P frame portion 1573; and
 ii) a second at least partially P frame 1584 different from said first at least partially P frame 1578 including:
  A) a first P frame portion 1575; and
  B) a second P frame portion 1577,
 said first P frame portion 1571 of said first at least partially P frame 1578 and said first P frame portion 1575 of said second at least partially P frame 1584 sharing an I frame parent 1570; and
 iii) a third frame 1582 that is at least partially spatially an I frame, said third frame having a position in said ordered plurality of video frames that is after said first at least partially P frame 1578 and before said said second at least partially P frame 1584.

According to some embodiments, the method further comprises:

b) ordering said plurality of frames according to an order recited.

According to some embodiments, the method further comprises:

c) transmitting said plurality of frames according to said order.

According to some embodiments, the method further comprises:

c) saving to non-volatile memory said first, second and third frames in a file according to said order.

According to some embodiments, a shape of at least one of an I frame portion and a P frame portion is determined dynamically.

According to some embodiments:
  i) said generating includes encoding a plurality of input frames; and
  ii) said determining is carried out in accordance with a dynamic region of interest detected within a plurality of input frame.

It is now disclosed for the first time an encoding device for encoding video frames comprising:
  a) a memory for storing a plurality of input frames;
  b) a frame encoder operative to encode plurality of video frames according to any of claims 21-33.

It is now disclosed for the first time a method for decoding video frames comprising:
  a) receiving a plurality of encoded video frame including a first hybrid video frame 1574 that includes an I frame portion 1583 and a P frame portion 1581;
  b) decoding said first hybrid video frame 1574 by:
    i) decoding said P frame portion 1581;
    ii) associating said decoded P frame portion 1581 with said I frame portions.

According to some embodiments, said decoding of said video frames includes
  i) decoding a second video frame 1578 different from said first video frame 1574; and
  ii) said second video frame includes:
    i) a first P frame portion 1571 encoded relative to said I frame portion 1583; and
    ii) a second I frame portion 1573 encoded relative to said P frame portion 1581,
    wherein said decoded second video frame is a generationally inhomogeneous video frame such that a P-generationality of said first P frame portion 1571 is different from a P-generationally of said second P frame portion 1573.

It is now disclosed for the first time a method of video frame decoding comprising:
  a) receiving a plurality of encoded video frames including:
    i) a first frame 1570 that is at least partially spatially an I frame;
    ii) a second frame 1578 that is generationally inhomogeneous and includes:
      A) a first P-frame portion 1571 that:
        i) is encoded relative to an I frame portion of said first frame 1570;
        ii) has a P-generationality equal a first number; and
      B) a second P-frame portion 1573 whose P-generationality is a second number different from said first number;
  b) decoding said receiver video frames.

According to some embodiments, said decoding of said plurality of video frames includes:
  b) decoding a third frame 1574 that is a hybrid frame including an I frame portion 1583 and a P frame portion 1581,
  wherein:
    A) said first P-frame portion 1571 of said second frame 1578 is also encoded relative to said P frame portion 1581 of said third frame 1574
    B) said second P-frame portion 1573 of said second frame 1578 is encoded relative to said I frame portion 1583 of said third frame.

It is now disclosed for the first time a method of decoding of video frame generation comprising:
  a) receiving a plurality of encoded video frames including:
    i) a first frame 1570 that is at least partially spatially an I frame;
    ii) a second frame 1574 that includes:
      A) a P frame portion 1581 encoded relative to a portion of said first frame 1570; and
      B) a I frame portion 1583; and
    iii) a third frame 1578 that includes:
      A) a first P frame portion 1571 encoded relative to said P frame portion 1581 of said second frame and to said portion of said first frame 1570; and
      B) a second P frame portion 1573 encoded relative to said I frame portion 1583 of said second frame; and
  b) decoding said received encoded video frames.

It is now disclosed for the first time a method of video frame decoding comprising:
  a) receiving a plurality of video frame including:
    i) a first at least partially P frame 1578 including:
      A) a first P frame portion 1571; and
      B) a second P frame portion 1573; and
    ii) a second at least partially P frame 1584 different from said first at least partially P frame 1578 including:
      A) a first P frame portion 1575; and
      B) a second P frame portion 1577,
  wherein:
    i) said first P frame portion 1571 of said first at least partially P frame 1578 and said first P frame portion 1575 of said second at least partially P frame 1584 share an I frame parent 1570;
    ii) said second P frame portion 1573 of said first at least partially P frame 1578 and second P frame portion 1577 of said second at least partially P frame 1584 have different I frame parents (1574 and 1582); and
  b) decoding said receiver video frames.

It is now disclosed for the first time a method of video frame decoding comprising:
  a) decoding an ordered plurality of video frames having an ordering, said generating including:
    i) a first at least partially P frame 1578 including:
      A) a first P frame portion 1571; and
      B) a second P frame portion 1573; and
    ii) a second at least partially P frame 1584 different from said first at least partially P frame 1578 including:
      A) a first P frame portion 1575; and
      B) a second P frame portion 1577,
    said first P frame portion 1571 of said first at least partially P frame 1578 and said first P frame portion 1575 of said second at least partially P frame 1584 sharing an I frame parent 1570; and
    iii) a third frame 1582 that is at least partially spatially an I frame, said third frame having a position in said ordered plurality of video frames that is after said first at least partially P frame 1578 and before said second at least partially P frame 1584.

It is now disclosed for the first time a decoding device for decoding video frames comprising:
  a) a memory for storing a plurality of encoded video frames; and
  b) a frame decoder operative to decode said plurality of encoded video frames according to any of claims 35-41.

According to some embodiments, the device further comprises:
  c) a flash memory card interface operative to present the decoding device as a flash memory card to a host device coupled to said decoding device,
  wherein said frame decoder is operative, upon receiving said plurality of encoded video via said flash memory card interface, to effect said decoding.

According to some embodiments, the decoding device is operative to provide a plurality of frames derived from said plurality of decoded video frames upon receiving, via said flash memory card interface, at least one of:
i) a flash memory card file read request; and
ii) a flash memory card data stream read request.

It is now disclosed for the first time a method of generating a video frame generation comprising:
a) generating a plurality of video frames including:
i) a first frame 1570 that is at least one frame that is at least partially spatially an I frame;
ii) a second frame 1578 that includes:
A) a first P-frame portion 1571 whose P-generationilty is a first number;
B) a second P-frame portion 1573 whose P-generationilty is a second number different from said first number.

It is now disclosed for the first time a method of providing a gaming service, the method comprising:
a) maintaining a virtual gaming universe including a plurality of gaming characters;
b) receiving data indicative of game commands from a plurality of client devices;
d) storing said data indicative of said game commands in a data cache;
e) modifying said virtual gaming universe in accordance with said cached gaming commands such that at least some said gaming commands are operative to modify said virtual gaming universe after a cache delay.

According to some embodiments, the method further comprises:
f) removing data associated with one or more said game application commands after said modifying.

According to some embodiments, at least some said game commands are filtered in accordance with other said game commands and discarded, and said virtual gaming universe is not modified in accordance with said discarded commands.

According to some embodiments, at least some said game commands are associated with a respective time stamp, and said filtering is performed in accordance with said respective time stamps.

It is now disclosed for the first time a method of providing a gaming service, the method comprising:
a) maintaining on a game server a virtual gaming universe including a plurality of gaming characters;
b) receiving data indicative of game commands from a plurality of client devices, each said client device associated with a different input latency; and
c) modifying said virtual gaming universe in accordance with said gaming commands, wherein an order in which game commands are applied to said virtual universe is determined in accordance with a game command client device network latency.

It is now disclosed for the first time a method of providing a gaming service, the method comprising:
a) maintaining on a game server a virtual gaming universe including a plurality of gaming characters;
b) receiving data indicative of game commands from a plurality of client devices, each said client device associated with a different input latency; and
c) modifying said virtual gaming universe in accordance with said gaming commands, wherein an order in which game commands are applied to said virtual universe is other than an order of said receiving.

It is now disclosed for the first time a system for providing a gaming services according by performing a method disclosed herein.

It is now disclosed for the first time a method of providing a gaming service, the method comprising:
a) maintaining a virtual gaming universe including a plurality of gaming characters;
b) generating at a given time a snapshot of a future state of a virtual gaming universe;
c) receiving data indicative of game commands after a time that said snapshot is generated (i.e. during a gap time);
d) if said received game commands contradict said generated snapshot of said future state of said virtual universe, discarding said contradicting game commands; and
e) generating at least one video image in accordance with said snapshot.

According to some embodiments, a gap time of said snapshot is at least 10 milliseconds.

According to some embodiments, a gap time of said snapshot is at least 20 milliseconds.

According to some embodiments, said snapshot is generated a plurality of times to produce a video sequence having a frame time.

According to some embodiments, a ratio between a gap time and a frame time is at least 0.2.

According to some embodiments, a ratio between a gap time and a frame time is at least 0.5.

It is now disclosed for the first time a method of providing a gaming service, the method comprising:
a) maintaining a virtual gaming universe including a plurality of gaming characters;
b) receiving data indicative of game commands from a plurality of client devices;
d) storing said data indicative of said game commands in a data cache;
e) modifying said virtual gaming universe in accordance with said cached gaming commands such that at least some said gaming commands are operative to modify said virtual gaming universe after a cache delay.

According to some embodiments, the method further comprises, f) removing data associated with one or more said game application commands after said modifying.

According to some embodiments, in at least some said game commands are filtered in accordance with other said game commands and discarded, and said virtual gaming universe is not modified in accordance with said discarded commands.

According to some embodiments, at least some said game commands are associated with a respective time stamp, and said filtering is performed in accordance with said respective time stamps.

It is now disclosed for the first time a method of generating video frames, the method comprising:
a) Rendering a plurality of video frames, each said video frame rendered in less than a first number of seconds;
b) Serving and/or presenting said rendered video frames at an average rate whose value is a second number of said rendered video frames per second, Wherein a ratio between a reciprocal of said first number and said second number is at a ratio number whose value is at least 2.

According to some embodiments, said ratio number is at least 5.

According to some embodiments, said ratio number is at least 7.

According to some embodiments, said ratio number is at least 10.

It is now disclosed for the first time a method of providing a gaming service, the method comprising:

a) maintaining on a game server a virtual gaming universe including a plurality of gaming characters;
b) receiving data indicative of game commands from a plurality of client devices, each said client device associated with a different input latency; and
c) modifying said virtual gaming universe in accordance with said gaming commands, wherein an order in which game commands are applied to said virtual universe is determined in accordance with a game command client device network latency.

It is now disclosed for the first time a method of providing a gaming service, the method comprising:
a) maintaining on a game server a virtual gaming universe including a plurality of gaming characters;
b) receiving data indicative of game commands from a plurality of client devices, each said client device associated with a different input latency; and
c) modifying said virtual gaming universe in accordance with said gaming commands, wherein an order in which game commands are applied to said virtual universe is other than an order of said receiving It is stressed that the present invention provides systems operative to perform any presently disclosed method.

It is stressed that the present invention provides methods for performing techniques of any presently disclosed system.

A computer readable medium comprising program instructions is disclosed, wherein when executed the program instructions are operable perform any presently disclosed method.

It is now disclosed for the first time a server-based system for providing gaming services, the system comprising:
a) an application server array adapted to effect a data transfer with each of a plurality of client devices that are each separate from said server array;
b) an input data aggregator for receiving data indicative of game commands from each of the plurality of client devices;
c) a game engine for maintaining a virtual gaming universe including a plurality of controllable gaming characters, said gaming engine operative to associate each said gaming character with said game commands of a respective client device; and
d) a multi-video output rendering engine residing in said application server array for generating from said virtual gaming universe a plurality of video streams each said video stream representing a view associated with a respective said game character,
wherein, for each said video stream of said plurality of video streams, said multi-video output rendering engine is operative to render said each video stream in accordance with respective data indicative of display characteristics of a respective target client device.

According to some embodiments, said indicative data includes at least one of:
device resolution, a device screen refresh rate, device contrast parameters, color parameters (for example, a number of colors), screen size and/or aspect parameters (for example, screen size or ratio between horizontal and vertical dimensions of the screen))

According to some embodiments the system further comprises:
e) a data provisioning mechanism operative to provide said indicative data to said rendering engine.

According to some embodiments said provisioning mechanism includes at least one of:
a) a database acesssor for accessing a database for said indicative data; and b) a client sniffer for deriving, for a given said client device, said indicative data from a communication received from said given client device.

It is now disclosed for the first time a system for providing a single-user or multi-user gaining service, the system comprising:
a) an application server array adapted to effect a data transfer with one or more client devices that are each separate from said server array;
b) an input data aggregator for receiving data indicative of game commands from each said client device;
c) a game engine residing at least in part in said application server array for maintaining a virtual gaming universe including at least one controllable gaming characters, said gaming engine operative to associate each said gaming character with said game commands of a said respective client device; and
d) a video output rendering engine residing in said application server array for generating from said virtual gaming universe at least one video stream,
wherein, for each said video stream of said at least one video stream, said multi-video output rendering engine is operative to render said each video stream in accordance with respective data indicative of display characteristics of a respective target client device.

It is now disclosed for the first time a method of providing a multi-player gaming environment, the method comprising:
a) providing within an application server array a game engine for maintaining a virtual gaming universe including a plurality of gaming characters;
b) at said application server, receiving data indicative of game commands from a plurality of client devices;
c) associating each said gaming character with said gaming commands of a different respective said client device;
d) within said application server array, generating a plurality of rendered video streams, each said video stream representing a game view associated with a respective said gaming character, each said rendered video stream generated in accordance with respective data indicative of display characteristics of a respective target client device.

It is now disclosed for the first time a method of providing a single player or multi-player gaming environment, the method comprising:
a) providing within an application server array a game engine for maintaining a virtual gaming universe including at least one gaming character;
b) at said application server, receiving data indicative of game commands from at least one of client device;
c) associating each said gaming character with said data indicative of gaming commands received from a respective said client device;
d) within said application server array, generating at least one rendered video stream, associated with a game view of said virtual gaming universe, each said rendered video stream generated in accordance with respective data indicative of display characteristics of a respective target client device.

These and further embodiments will be apparent from the detailed description and examples that follow.

BRIEF DESCRIPTION OF THE DRAWINGS

FIGS. 7A-7C and 8 provide diagrams describing technique for generating a plurality of snapshots descriptive of the virtual universe at different points in game time in accordance with some embodiments of the present invention.

FIG. 13C describes, by example, a scheme for generating I frames and P frames.

FIG. 14A describes exemplary hybrid frames.

FIG. 16 describes an example for input frames are encoded.

FIG. 17 describes an exemplary system including a host (for example, a mobile phone) and a peripheral card operative to decode video content that is coupled to the host.

DETAILED DESCRIPTION OF EMBODIMENTS

The present invention will now be described in terms of specific, example embodiments. It is to be understood that the invention is not limited to the example embodiments disclosed. It should also be understood that not every feature of the system, method and computer-readable code for providing an electronic gaming environment for a multi-player game or for encoding, transmitting or decoding video content is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

The present inventor is now disclosing systems, methods, apparatus, devices and computer code for providing gaming services and for handling video content. Various teachings relating to providing gaming services will be explained with reference to FIGS. 2-11. Various teaching relating to handling video content (for example, encoding or decoding video content) will be explained with reference to FIGS. 12-17.

Discussion of Embodiments Related to Providing an Electronic Gaming Environment With Reference to FIGS. 2-11

The present inventor is now disclosing a system, method and computer-readable code for providing an electronic gaming environment for a multi-player game. Each human player accesses the gaming environment through a respective client device having a data input mechanism (for example, keyboard such as a phone keypad, or a trackball, or a joystick, etc.) and a display screen. These client devices effect a data transfer with an applicant server array separate from the client devices. Much of the computation for supporting the game environment is carried out within the application server array, and thus the client device may function as a "thin client" for accessing the gaming environment. In particular, the game engine itself may reside in the application server as illustrated in FIGS. 2A-2C.

Figure 2A:
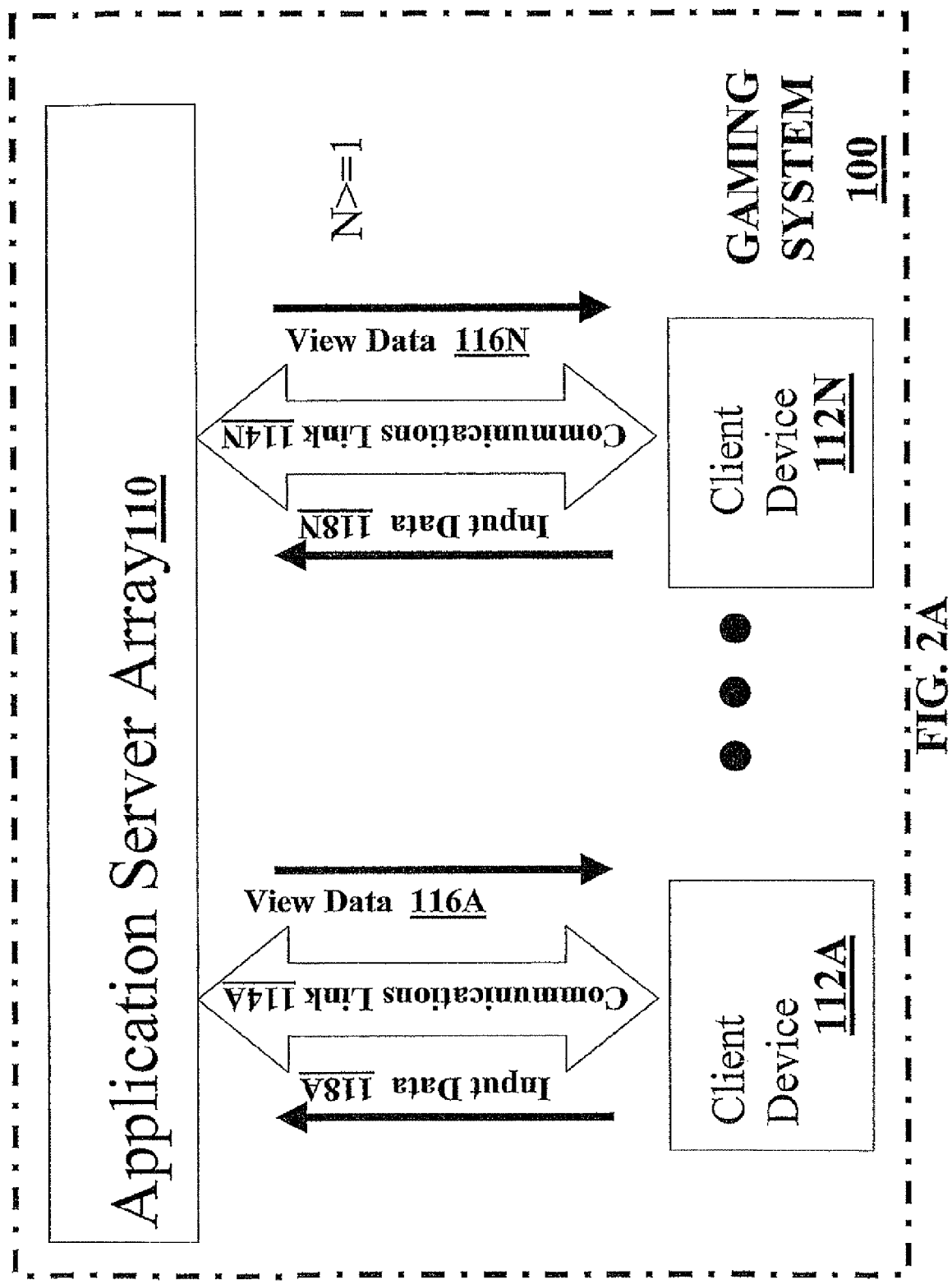
FIGS. 2A-2C provide a block diagram of an exemplary gaming system where a game engine resides on the server side in accordance with some embodiments of the present invention.
Figure 2B:
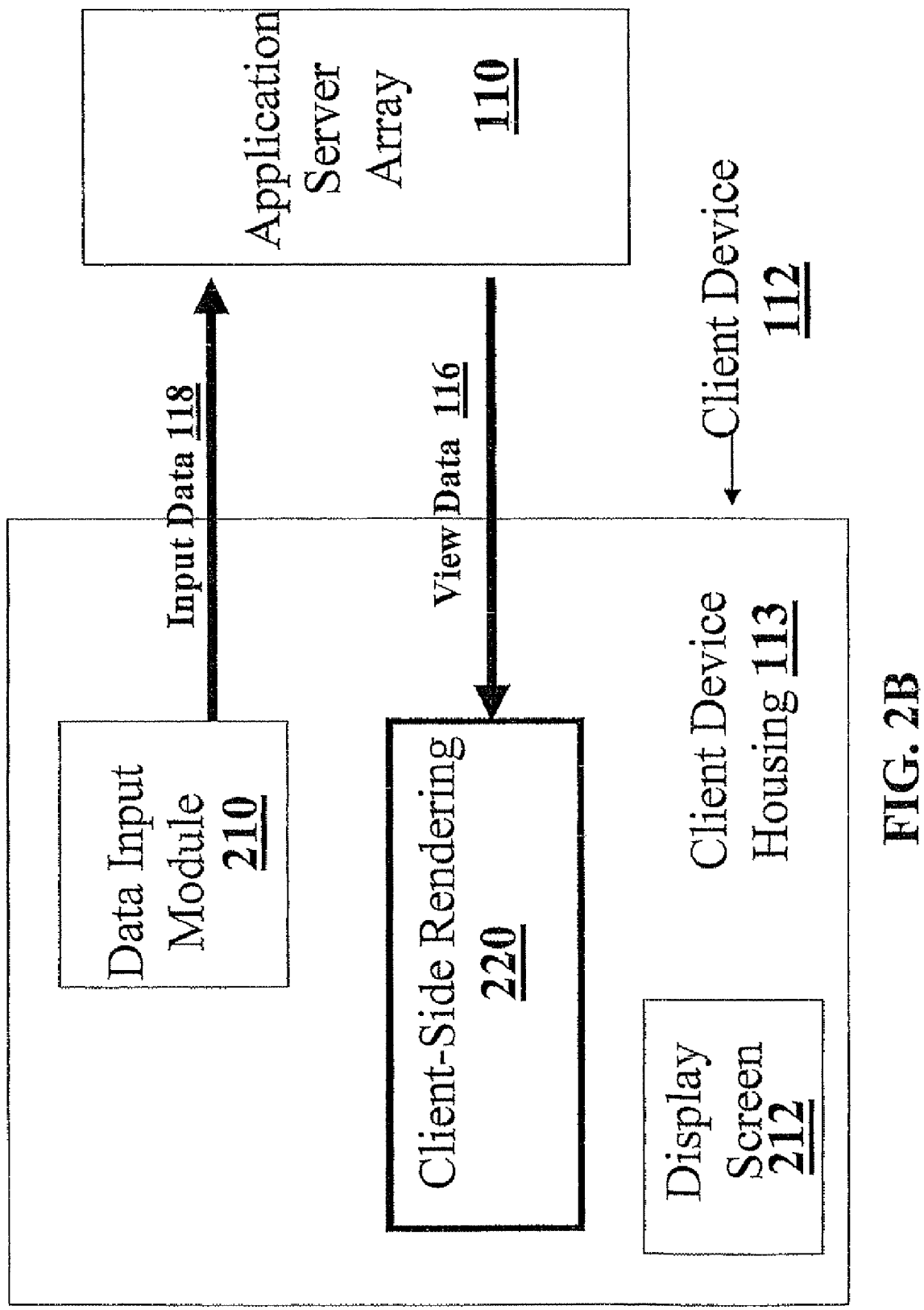
Figure 2C:
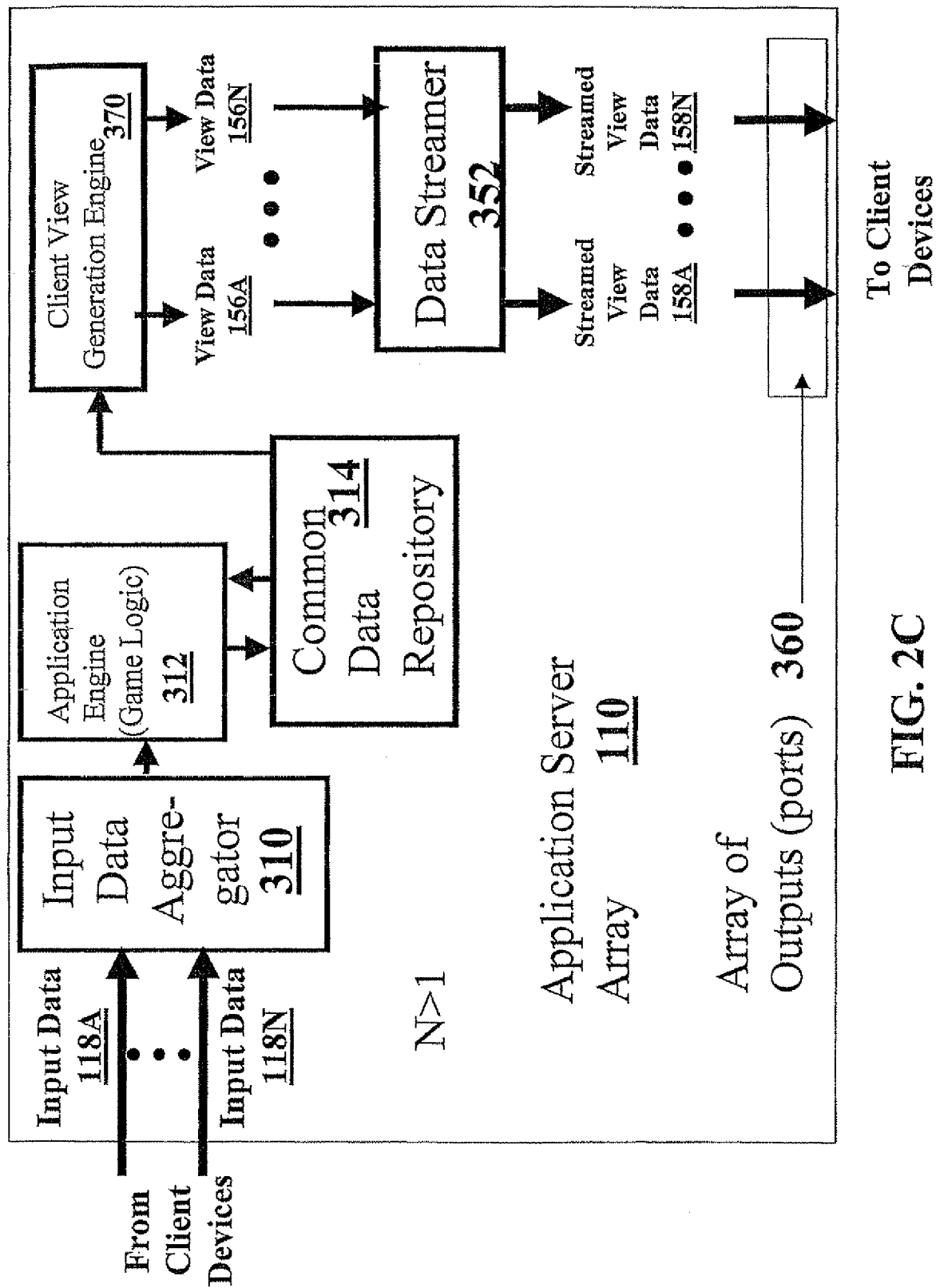
Figure 3A:
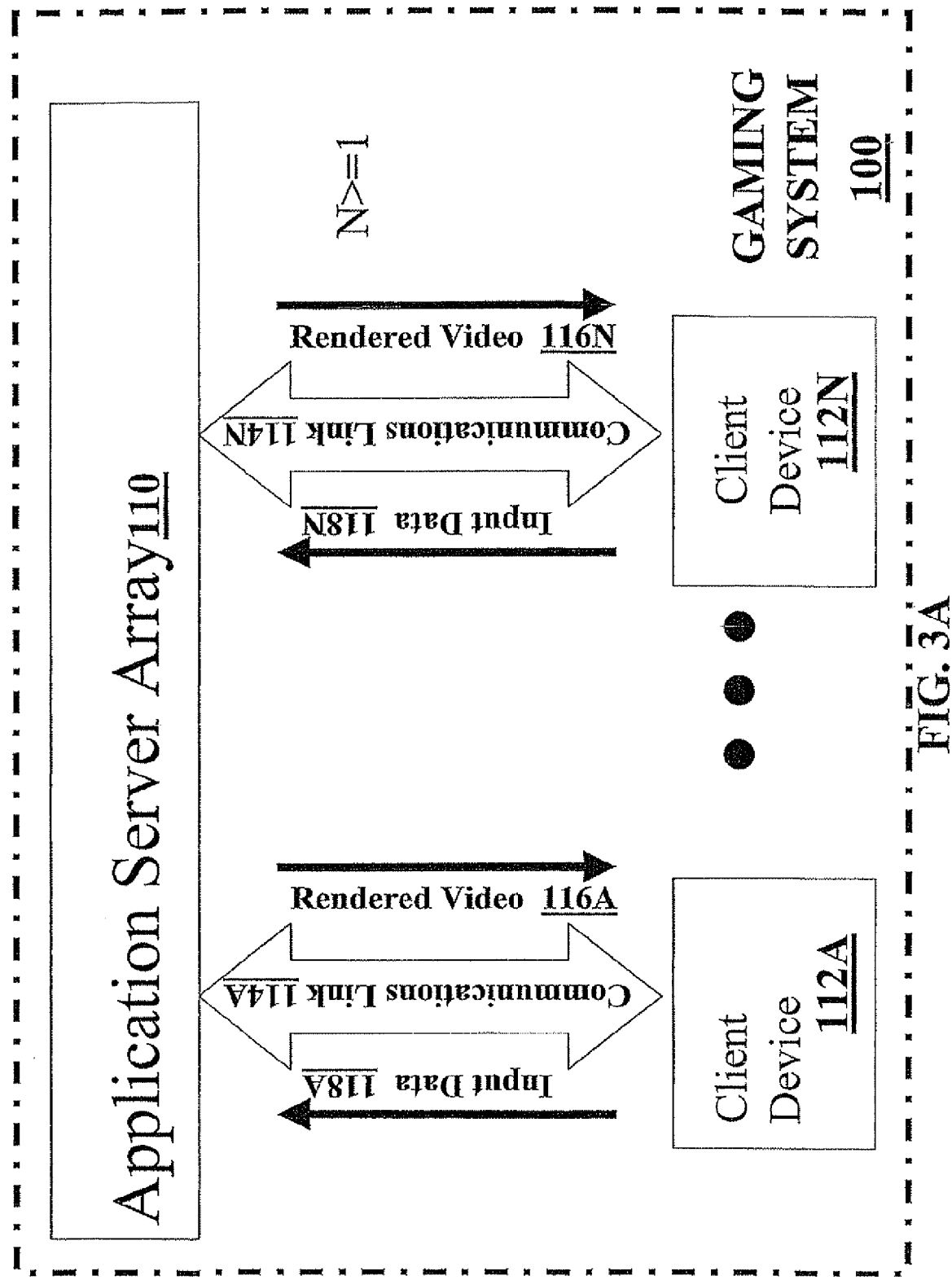
FIGS. 3A-3C provide a block diagram of an exemplary gaming system where a game engine resides on the server side and video is rendered on the server side in accordance with some embodiments of the present invention.
Figure 3B:
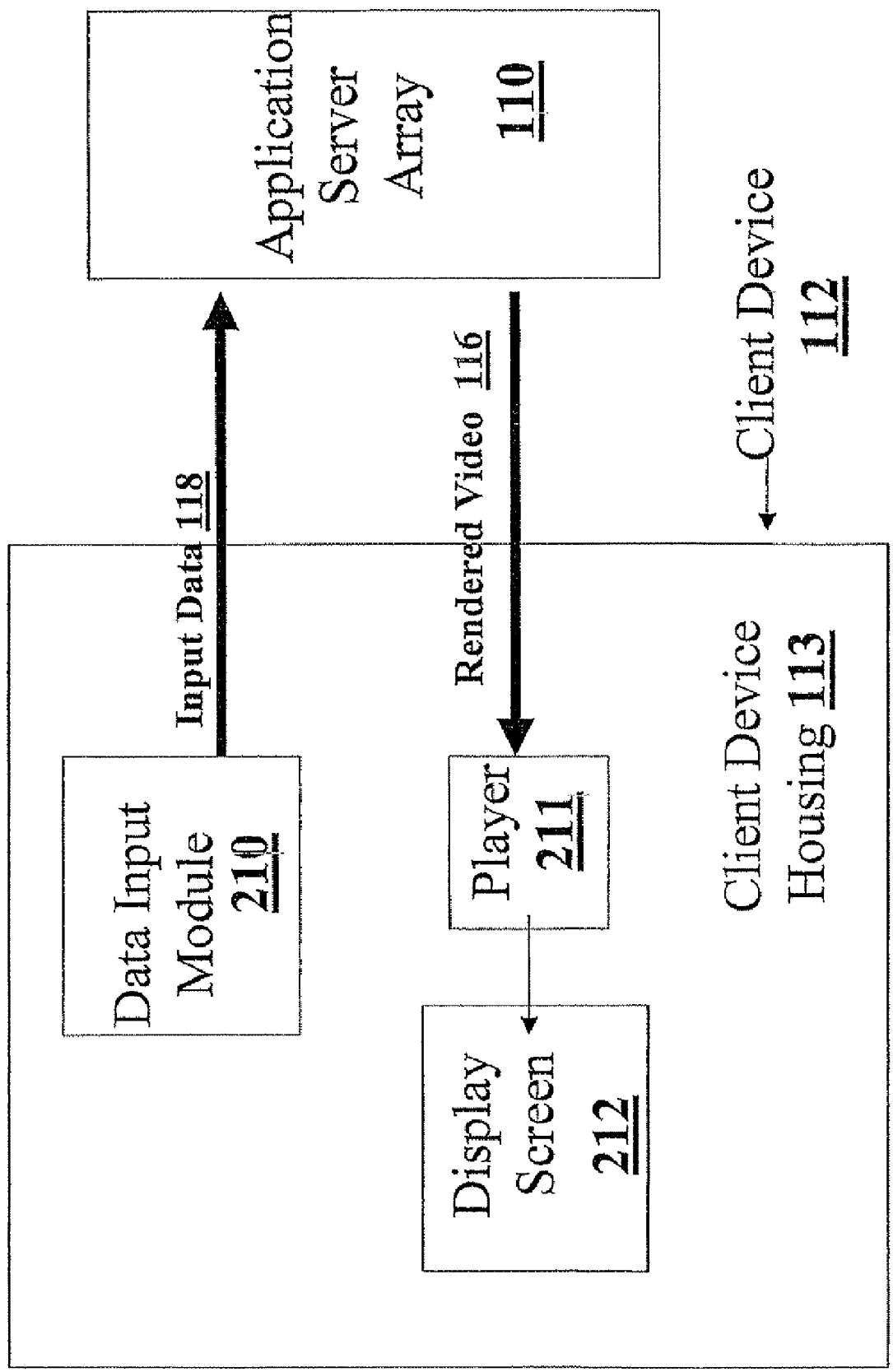
Figure 3C:
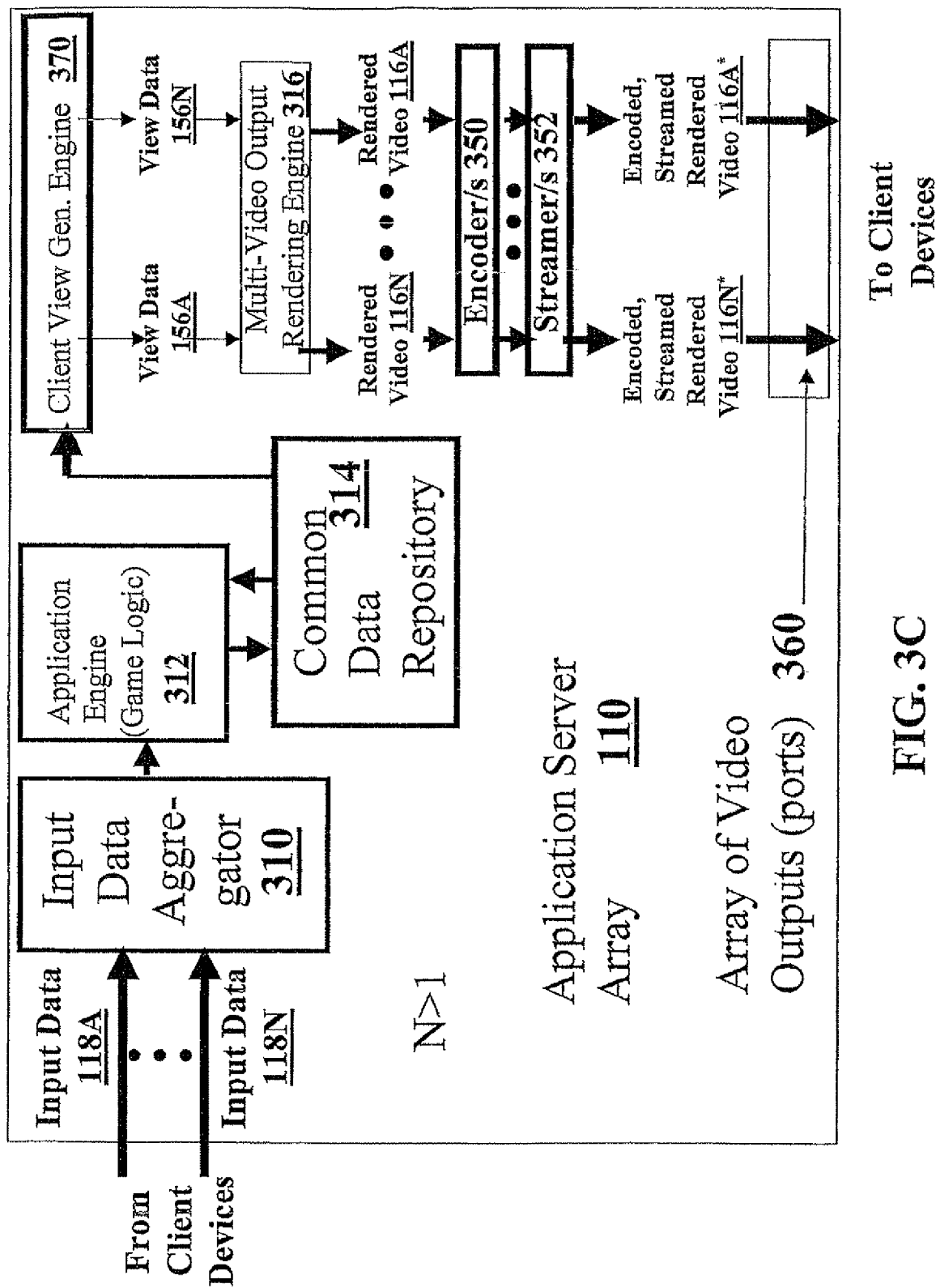

In contrast with the examples of FIG. 2A-2C, the systems described in FIGS. 3A-3C relate to the case where video output is rendered on the server side, and served to the client device 112, thereby offloading a portion of the computational load needed to maintain the gaming environment from the client device to the game application server array.

As used herein, when a first device "effects a data transfer" with a second device, the first device effects at least one of sending data to the second device and receiving data from the second device. In some embodiments, this refers to the situation where the first and second device sends data to each other and receive data from each other.

FIG. 2A provides a block diagram of exemplary multi-player interactive gaming system 100A in accordance with some embodiments of the present invention. Each human player enters game "commands" (for example, directives for a game character to perform a specific action within the virtual gaming universe, such as to move a "game character") through a data input mechanism or module 210 of a client device 112 (see FIG. 2B). According to the example described, there are one or more client devices 112 accessing the application server array.

Although typically the user can send 'command data' using the data input mechanism or module, in some embodiments the user can send data other commands.

Input data 118 including data indicative of these game commands are sent over a communications link 114 (for example, a 'wireless' communications link) to an array of one or more game application servers 110. The application game server array 110 (i.e. one or more application servers, in a centralized location, or distributed within a computer network, for example, including one or more game consoles) processes game commands received from a plurality of client devices and streams back to each client device respective view data 116. Each frame of this streamed view data provides a 'snapshot' of a virtual gaming world (or portion thereof) from a given 'point of view' at a given moment in time. Various snapshots are streamed to the client device. As shown in FIG. 2B, the view data may be rendered on the client side with a client-side rendering element 220. The rendered view data is then displayed on a display screen 212 of the client device.

It is noted the rendering element 220, as with any other component described in the present disclosure and/or the accompanying figures, may be implemented in any combination of software and hardware.

Typically, each client device 112 is used by a different human player who controls, using the client device, a different "game character(s)" of the game universe. The display screen 212 of the client device 112 thus provides the human player a view into the virtual universe of the game. In some embodiments, more than one client device 112 may be served identical (an/or substantially identical) rendered view streams 116.

Alternatively or additionally, different client devices are served different video, streams, which may vary in accordance with one or more of a number of factors. Exemplary factors include but are not limited to a point of view, a frame rate, a type of encoding, bandwidth, a client parameter (such as screen size and/or screen resolution), and user preferences.

Thus, in particular embodiments, each client device may be provided with a different view associated with the specific game character controlled by the specific client device. Thus, it is recognized that the view data 116 sent to each client device may be different, in accordance with the game character being played by the human player using the client device.

More specifically, each client device 112 may, in some embodiments, receive a respective view data 116 stream associated with the gaming character controlled by the game commands provided by the respective client device 112 and with respect to the client's physical capabilities and its connection. In particular embodiments, each rendered video stream 116 could provide a different "view" into the virtual gaming universe associated with the character controlled by the respective client device. It is noticed that this view may be a "first person" game view within the virtual universe associated with the respective controlled game character, or a "third person" game view within the virtual universe associated with the respective controlled game character. Other types of views (i.e. other than first person and third person) associated with a specific game characters may also be provided.

In particular embodiments, a view (and not just the administration of the virtual game universe) may be defined by the game engine 312. In one example, it is decided that if a certain player receives a certain number of points, he is "rewarded" with a deeper view (for example, the ability of to 'see' further) of the virtual universe. The skilled artisan will be able to provide numerous examples.

FIG. 2C provides a diagram of the application server array 110 in accordance with exemplary embodiments of the present invention. Although the application server array 110 drawn is a single entity having single instances of each component, it is appreciated that one or more of the components depicted (and/or multiple instances of each component) here may be located in different locations within a computer network. Furthermore, it is appreciated that the system may not be limited to a single application server array 110, and that there may be redundant application server arrays situated at different locations in the network.

Thus, referring to FIG. 3A, it is noted that input data from the plurality of client devices is received by an input data aggregator 310. The input data 118 includes the game commands from the client devices.

Application Engine 312 (Game Engine)

This data is made available to the application engine or game engine 312 which includes game logic (for example, a set of game rules, such as the rule that a bullet object that reaches a game character may injure or kill the game character or remove that "hit" game character from the game).

Information about the current state of the game is stored in a common data structure or data repository 314. The data repository 314 may include the data necessary to represent or 'model' the virtual game universe, including but not limited to one or more of geometry data, viewpoint data, texture data and lighting information. Along with the aforementioned data, data related to the virtual universe that is stored in memory may also include game specific data.

The data repository may be implemented using any combination of volatile and non-volatile memory. In exemplary embodiments, the data repository may include status information about user-controlled game characters and/or computer 'game-master' controlled game characters (non-limiting examples of status information include one or more of the positions and/or orientations of each game character.

Thus, the game engine or application engine 312, in accordance with game logic, maintains the virtual game universe by maintaining and modifying the appropriate data structures within the common data repository 314 which represent the virtual universe in accordance with game logic. Although FIG. 2C depicts the input data as flowing directly to the application engine 312 from the input data aggregator 310 it is appreciated that this is in accordance with exemplary embodiments, and in other embodiments, the input data aggregator 310 is not directly linked to the application engine 312.

Application engines which including game logic 312 are well known in the art. Any game engine or application engine and any game engine architecture are appropriate for the present invention. In exemplary embodiments, the game engine may include one or more of a physics engine, an AI agent, and one or more game libraries, though embodiments with other game engine components are contemplated as well.

In some embodiments, the game engine 312 may modify the common data repository 314 representing the virtual universe in accordance with rules of the game application. In other words, the game engine 312 may update the common data repository 314 (i.e. effect a change to the virtual game universe) in accordance with input data 118 including game command data received from the client devices 112. According to one non-limiting example, if a game character is shot by another character, the character's "health" attribute is reduced and the character is partially disabled.

As noted above, the application engine 312 maintains the virtual universe in accordance with 'game logic.' One element of game logic enforced by the game engine 312 relates to maintaining some standard of time in the virtual game universe. In the real physical universe certain laws of how objects behave involve time—referred to in the present disclosure as 'real time' or physical time and associated with the symbol $t^r$. Similarly, in the virtual gaming universe maintained by game engine 312, certain laws of how objects within the virtual gaming universe behave also involve time—referred to in the present disclosure as 'game time' and associated with the symbol $t^c$.

In one example, if an object moves with a certain velocity within the virtual universe, the position will change with respect to time—in this case the position in the virtual universe will change with respect with the time $t^c$ of the virtual universe.

Figure 4:
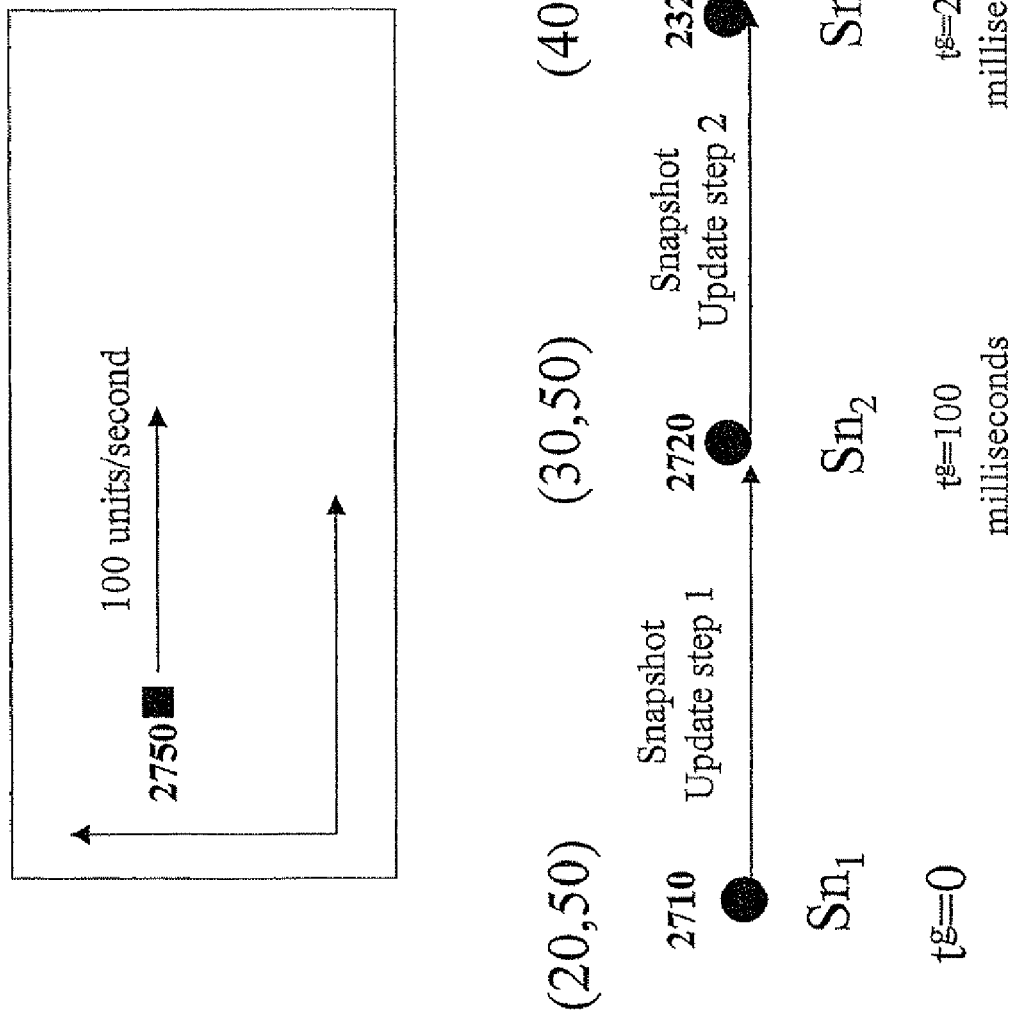
FIG. 4 describes certain snapshots of a virtual universe in a particular example.

This is illustrated in FIG. 4 where a given object 2750 is moving within the virtual universe at a rate of 100 unites/second in the x direction according to the rules of the game logic. The game engine 312 may generate a 'snapshot' of an aspect of the virtual universe that includes that position of the object 2750 for different moments in time (i.e. in 'game' time). In the example of FIG. 4, three snapshots 2710, 2720 and 2730 are generated—each snapshot corresponds with a different moment in 'game time'. According to each snapshot, the object 2750 has a different position—in snapshot 2710 associated with time $t^c$ the object has a position (20,50) in the virtual universe; in snapshot 2720 associated with time $t^c$ the object 2750 has a position (30,50) in the virtual universe; in snapshot 2730 associated with time $t^c$ the object 2750 has a position (40,50) in the virtual universe.

The game engine 312 may thus generate a series of snapshots in accordance with game rules or game logic. Typically, the game engine will derive a snapshot associated with a later time from a snapshot associated with an earlier time by running the game engine forward in time—for example, in discrete time increments associated with a 'game engine cycle'.

In some embodiments, the game engine includes a mechanism for synchronizing game time $t^c$ with real time $t^r$ to provide an appropriate gaming experience to the user(s). For example, if the game engine is run on a 'fast machine' or if the amount of computing resources required for a given forward step in time between two snapshots is 'small,' the game engine may 'wait' or 'sleep' in order to synchronize between a given step forward in 'game time' $t^c$ and an amount of real time $t^r$.

As used herein, a 'snapshot' refers to an electronic representation of at least one aspect of the virtual universe associated with a given moment in game time $t^c$. In one example, this snapshot may be stored in the common data repository 314. In another example, one or more snapshots may be sent to the client device as view data—either unrendered view data 116 as shown in FIGS. 2A-2C or as rendered view data as shown in FIGS. 3A-3C.

In one example, the "snapshot" may be descriptive of the positions of one or more objects within the 2 or 3 dimensional space of the virtual universe and optionally within the configuration space defined by the internal degrees of freedom (for example, the orientation of an object without spherical symmetry relative to space-fixed coordinate axis) at a given instant in time. This instant of time is not necessarily the same time at which the "snapshot" is generated. It is appreciated that just as in the physical "real" world different objects have positions and orientations that vary as a function of time, in the virtual world the positions and/or orientations and/or configurations and/or colors and/or other visual properties of objects (for example, gaming characters) vary as a function of time.

In the example of FIG. 2C, the application server array 110 includes a client view generation engine 370 for generating, using the game engine, a snapshot of the virtual universe for a given gaming character in the virtual universe. This snapshot is generated relative to a state of the gaming character for a given game time $t^c$ and may depend, for example, on a position or orientation of the gaming character at a given time, or on other state information relating the gaming character (for example, eye strength or view privilege information) at the given time.

For the case of a multi-user gaming system, each client device may be associated with a given gaming character. Thus, the client view generation engine 370 generates, for each gaming character, respective view data associated with the state of the gaming character at the given moment in game time $t^c$. For a given gaming character, the view data may then be sent to the appropriate client device (i.e. associated with the given gaming character) by data streamer 352.

Although certain embodiments have been explained in terms of each user controlling a "single" game character or entity, it is appreciated that in some embodiments, a plurality of users may control a single game character and/or a single user may control more than one game character.

Both FIGS. 2A-2C and FIGS. 3A-3C relate to the case where the game engine 312 resides on the server side and enforces 'game rules'—for example, 'game physics.' In the embodiments of FIGS. 3A-3C, view data is rendered on the client side. Rendering of view data of a virtual gaming universe on the server side is described in WO/2006/100664 which is not prior art relative to the present application. As noted before, WO/2006/100664 is incorporated into the present application by reference in its entirety.

Not wishing to be bound by theory, it is noted that in accordance with some embodiments of the present invention, video output is rendered on the game server (i.e. in the application server array), obviating the need to render the video output on the client device. This may offloads some or even a significant portion of the load associated with providing the gaming environment from the client device to the application server arrays which are separate from the client devices. In some examples, this may enable client devices which lack the resources provide a specific gaming environment (for example, because the client device lacks the computations resources to render "rich" video) to nevertheless, provide an interface to this gaming environment, and to allow the user to access this gaming environment using the data input (i.e. phone keypad, joystick, gaming pad) and screen of the client device.

Thus, in FIGS. 3A-3C, the client devices receive video 116 that is rendered view data from the application server array 112. Furthermore, application server array 110 includes a multi-video output rendering engine which renders the view respective view data. The rendered video is encoded by an encoder 350 and streamed to the client devices 112 by streamer 352.

There is no limit on the format of encoded video outputted by the encoder 350. Exemplary formats include but are not limited to MPEG4, MPEG2, JPEG and JPEG2000. In some embodiments, the video streamer 352 is operative to send a video file or files, and includes buffer management functionality.

Each client device receives a stream of rendered respective video 116 from the application server array 110. Typically, but not necessarily, each rendered stream of rendered video 116 is different, in accordance with a view (i.e. third person or first person) associated with the respective gaming character associated with the respective client device 112.

Thus, it is noted that although it is not a requirement for the present invention, usually, encoded video (denoted with the 'prime'—i.e. 116') is served to each client device 112.

Although certain aspects of the present invention have been explained in terms of the case where there are a plurality of client devices served by the application server array, this is not a limitation, and some embodiments provide an application server for providing gaming services to a single device, as illustrated in FIG. 3D.

Rendering is a process of generating an image (for example, a raster graphics image, for example, a digital image) from the representation of the virtual universe, and may be carried out in software, hardware or any combination thereof. This term is well known in the art, and as noted by Wikipedia, "may be by analogy with an 'artist's rendering' of a scene".

In some embodiments, the 'rendering' may also be accompanied with calculation of special effects (for example, sound) within the application server. These 'special effects' may then be associated with the rendered video 116 (for example, by embedding special effect data within a single data video stream or video file which is sent to one or more client devices).

The operations performed by the rendering engines may include any operation typically performed by a video rendering engine. Thus, in some embodiments, light transport calculations (for example, using a radiosity technique and/or a ray tracing technique) are effected (i.e. creation of a video image in accordance with the geometry and lighting of a given scene). Wikipedia has given a list of algorithms and techniques associated with rendering, and according to some embodiments of the present invention, video rendering operations may include one or more of the following (quoted, within minor modifications, from the Wikipedia article on "Computer Graphics: Rendering") of the following, in any combination: shading (i.e. determining how the color and brightness of a surface varies with lighting), texture-mapping (i.e. a method of applying detail to surfaces), bump-mapping (i.e. a method of simulating small-scale bumpiness on surfaces), determining fogging/participating medium (i.e. determining how light dims when passing through non-clear atmosphere or air), shadowing (i.e. determining the effect of obstructing light), soft shadowing (i.e. determining varying darkness caused by partially obscured light sources), reflection calculations (i.e. determining mirror-like or highly glossy reflection), transparency calculations (i.e. computing sharp transmission of light through solid objects), determining translucency (i.e. determining highly scattered transmission of light through solid objects), determining refraction (i.e. computing bending of light associated with transparency), determining indirect illumination (i.e. for surfaces illuminated by light reflected off other surfaces, rather than directly from a light source), caustics (i.e. a form of indirect illumination) (determining reflection of light off a shiny object, or focusing of light through a transparent object, to produce bright highlights on another object), effecting a depth of field calculation (i.e. objects appear blurry or out of focus when too far in front of or behind the object in focus), effecting a motion blur calculation (i.e. objects appear blurry due to high-speed motion, or the motion of the camera), effecting a photorealistic morphing (i.e. photoshopping 3D renderings to appear more life-like), effecting a non-photorealistic rendering (rendering of scenes in an artistic style, intended to look like a painting or drawing).

Other non-limiting examples of video rendering operations include but are not limited to color calculation, texture calculation, shadow calculation, shading (i.e. defined by Wikipedia as "determining how color and/or brightness of an object or surface varies with lighting"), alpha blending, depth testing, and rastering. It is appreciated that many rendering engines may effect one or more rendering operations not listed herein.

Although rendering has been discussed in terms of rendering at least one 'single' image, it is appreciated that rendering typically this includes creation of an 'animation' of a plurality of video images.

All of the aforementioned components of the application server array 110 may be implemented as hardware, software, or any combination thereof. In exemplary embodiments, either the rendering engine may be implemented at least in part in hardware, for example, using one or more graphic accelerator cards (for example, video cards or screen cards, for example, a plurality of graphics cards in parallel) that reside within the application server array 110.

A Discussion of the Communications Link 114

Figure 1:
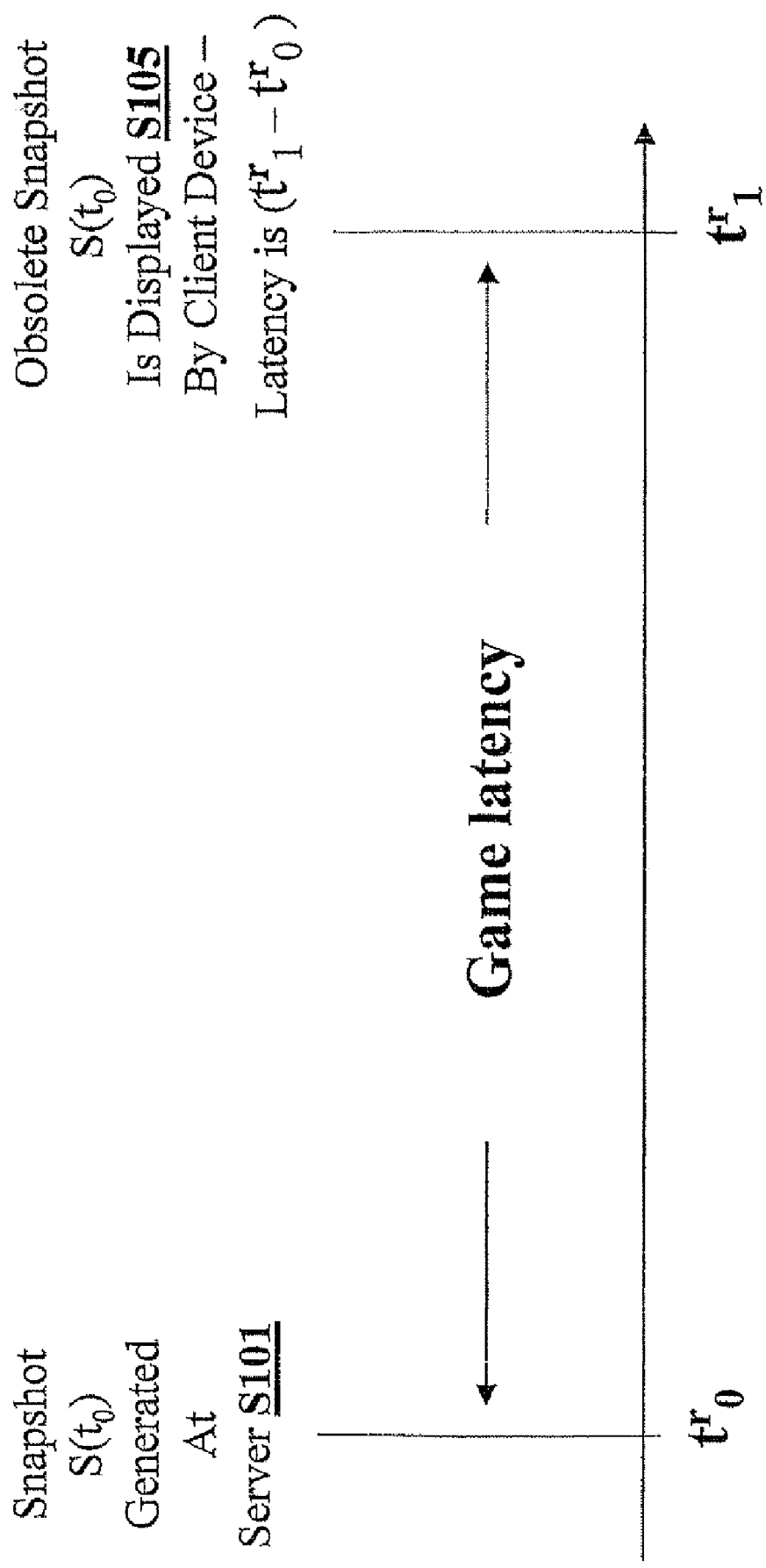
FIG. 1 provides a description of serving a snapshot of a virtual gaming universe in a system where there is game view latency.

Referring once again to FIG. 1, it is noted that although the communications link 114 is illustrated as a single bi-directional communications link, it is appreciated that in different embodiments, a plurality of communication links, including a link for uploading input data 118 to the application server array 110 and a link for downloading rendered streamed 116 to the client device 112, may be provided. In exemplary embodiments, a video compression engine may be provided on the server side, along with video decompression engines on the client side. In exemplary embodiments, a streaming server may be provided on the server side.

There is no limitation on the type of communications link 114 that may be used to transfer data between the application server array and the client device. Thus, in some embodiments, the application server array 118 and the client device 112 may communicate through a switched network, including but not limited to a packet switched network and a circuit switched network (telephony network) or/and a multiple access link network. For the purposes of this application, when two devices communicate through a switching network, the communication link between the devices is defined as a "switching network link."

Alternatively, the communications link 114 may be other than a switching network link. For example, the client devices may communicate with the application server array using a "point-to-point" communications link (for example, a wireless point-to-point communications link) (for example, a communications link other than a switched or multiple access link communication).

Thus, it is appreciated that both local and wide networks of any type are within the scope of the basic invention. Exemplary communications networks include but are not limited to WiMax, Wi-Fi, Bluetooth, high performance wired or wireless networks such as WLAN (wireless LAN), WAN (including WWAM) other than a telephony network.

An Additional Discussion about Application Server 110 Architecture

Until now, the system has been explained in terms of a single application server array 110. It is noted that the various components of the application server array need not reside in a single location, and may reside on a plurality of machines, either local to each other or distributed through a network. Furthermore, in FIG. 3, single instances of each component are depicted, though this is not a limitation of the present invention. In one example, multiple instances of the input data aggregator 310 (and/or an input data aggregator 310 'distributed' through the network) is provided. According to this example, the input data aggregator 310 may reside on 'host servers' distributed through the network and operatively linked to 'game servers' which host the application engine 312. Moreover, there may be redundancies (for example, hardware redundancies) to provide fault resilience.

In one preferred embodiments related to a multi-player gaming server provided over a wide area network (for example different cities), there are redundant rendering engines. Client devices then tend to receive video rendered in an application server that is more "local" within the network to the client device (i.e. a client device in Boston is more likely to be served video generated at an application server in Boston than video generated in Tel Aviv). Thus, data describing game commands and/or the state of the virtual universe and/or the state of the common data repository may be exchanged between application servers having redundant rendering engines 316. This may obviate the need to send band-width intense video over a wide area or between servers.

There is no requirement for redundancy of the common data repository 314 or of the application engine 312, though embodiments where each application server provides the application engine 312 are also contemplated.

It is noted that when there are redundant application servers, it may be necessary to synchronize data between the respective application servers to provide data integrity.

Typically, these application server arrays may exchange data with each other in order to maintain integrity of the common application data structure 120 to provide a consistent virtual universe for garners accessing each server. This data exchange could include forwarding the input device from each client device to each application server. Alternatively or additionally, the data exchange may include exchanging common application data structure (i.e. "synchronizing" the data of the redundant data structure residing on each server with each other).

There are a number of scenarios where one might prefer to use redundant application servers. For example, it may be decided that such an architecture uses fewer bandwidth resources because exchanging input data and/or common application data structure data may be more bandwidth efficient than distributing video content to different locations in the network (for example, locations within the network which are "far" from each other).

A Technique for Reducing Game Latency

Figure 5A:
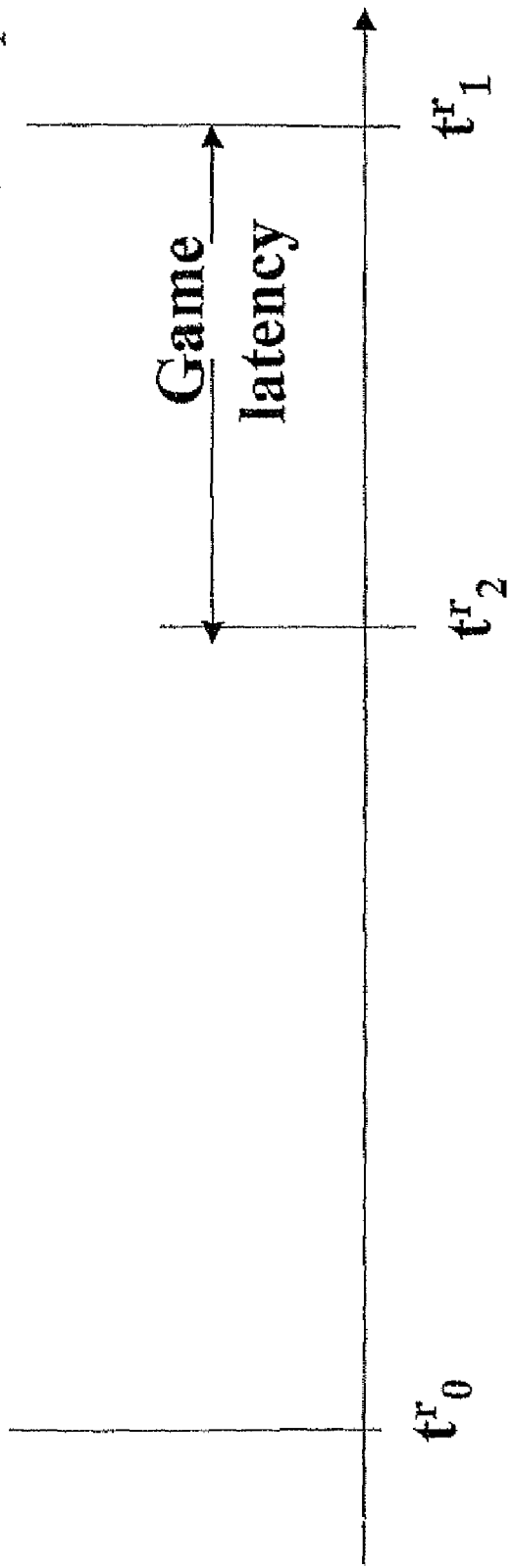
FIG. 5A-5B provides a description of serving a reduced-latency snapshot of a virtual gaming universe in accordance with some embodiments of the present invention.
Figure 5B:
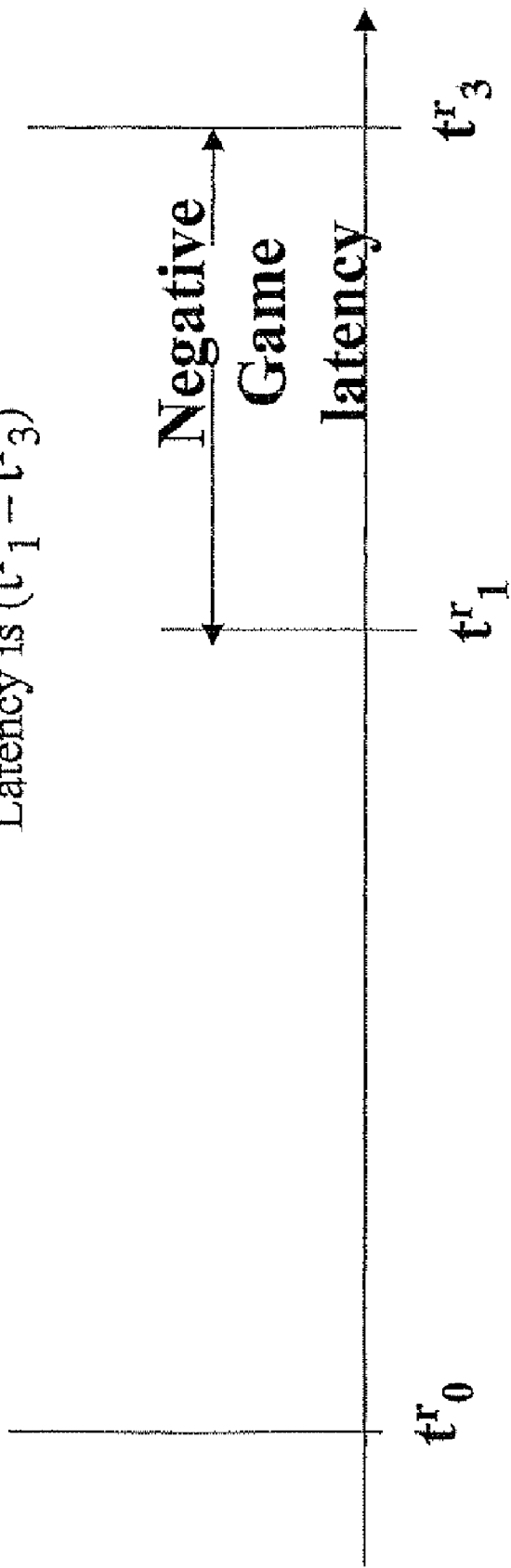

According to the technique described in FIG. 5A-5B, instead of sending to the client device a 'current snapshot' (for example, indicative of a 'current status') of the virtual gaming world, a 'future status' of the virtual gaming world may be predicted—for example, by the gaming engine 312 using the game rules or game logic.

In the example of FIG. 5A, instead of generating a snapshot of the virtual universe for time $t^r_1$, a predicted state of the virtual universe for some time in the future $t_2$ is obtained—for example using the game engine or game rules/logic. For any given moment in time, it may be possible to "predict" the future state of the virtual world based on all game commands received and/or processed up until that time and/or the data stored in the common data repository 314.

It is not necessary to explicitly specify the future real time $t^r_2$—the future real time is provided explicitly in the present example for illustrative purposes only.

By sending to the client device a 'future snapshot' rather than a 'current snapshot,' it is possible to reduce game latency—in the example of FIG. 5A, where a future snapshot of the game universe at time $t^r_2$ (rather than current time $t^r_0$) is generated, the game latency is reduced by $(t^r_2-t^r_0)$. As will be discussed later, the price for reducing game latency may be a loss of 'user-perceived game integrity' when a 'contradicting' snapshot of the virtual universe may be presented to the user.

In one non-limiting example, the virtual world includes an object moving along a certain trajectory (i.e. a path where the future position of the object may be determined as a function of time for at least a certain time interval) at a certain velocity. At the time the snapshot is generated (i.e. time t=t'), the position of the object is (x0,y0,z0). Furthermore, based upon data known to the system at time t=t', it may be determined that at a future time t'', the position of the object will be (x1,y1,z1). Thus, it is possible to generate at time t' a "snapshot" valid for the future time (i.e. a time t''>t') where in this snapshot the position of the object is (x1,y1,z1). It is appreciated that this concept may be generalized to a plurality of objects, and to other properties (i.e. other than object position) effecting the visual representation of the physical world.

In the example of FIG. 5B, the prediction is carried out for a point in time $t^r_3$ after $t^r_2$—a point of time 'far in the future.' In the example of FIG. 5B, a 'negative latency' may be provided—i.e. the device receives at a point in time $t^r_1$ a description of a predicted view of the virtual universe for $t^r_3$ where $(t^r_3 > t^r_1)$.

It is appreciated that in some systems, network latency may provide a significant contribution to overall latency. Thus, if the network latency is assessed (for example, measured explicitly or 'guessed' or 'predicted' from available data—for example, relating to the physical or network location of a client device) to be 'large,' a 'further in the future' predicted snapshot will be sent to the client device. If network latency is assessed to be 'smaller' the 'gap time' between the time of the predicted snapshot and the 'current snapshot' will be smaller.

In one example, the 'gap time' or 'time in the future' (either a gap in 'real time' and/or a gap in 'game time') is determined in accordance with an assessed one way and/or round trip latency between the server array and a given client device.

In one example, the 'gap time' or a 'predicted image' associated with a game view associated with a 'first client device' is determined in accordance with an assessed latency (for example, measured or predicted) of a second client device different from the first client device. This second client device may be, for example, the client device with the greatest latency or an average latency among a group of client devices.

It is appreciated that in some embodiments, the 'gap time' (described below) or 'distance in the future' of the predicted snapshot may vary in time, as latency varies in time.

Figure 5C:
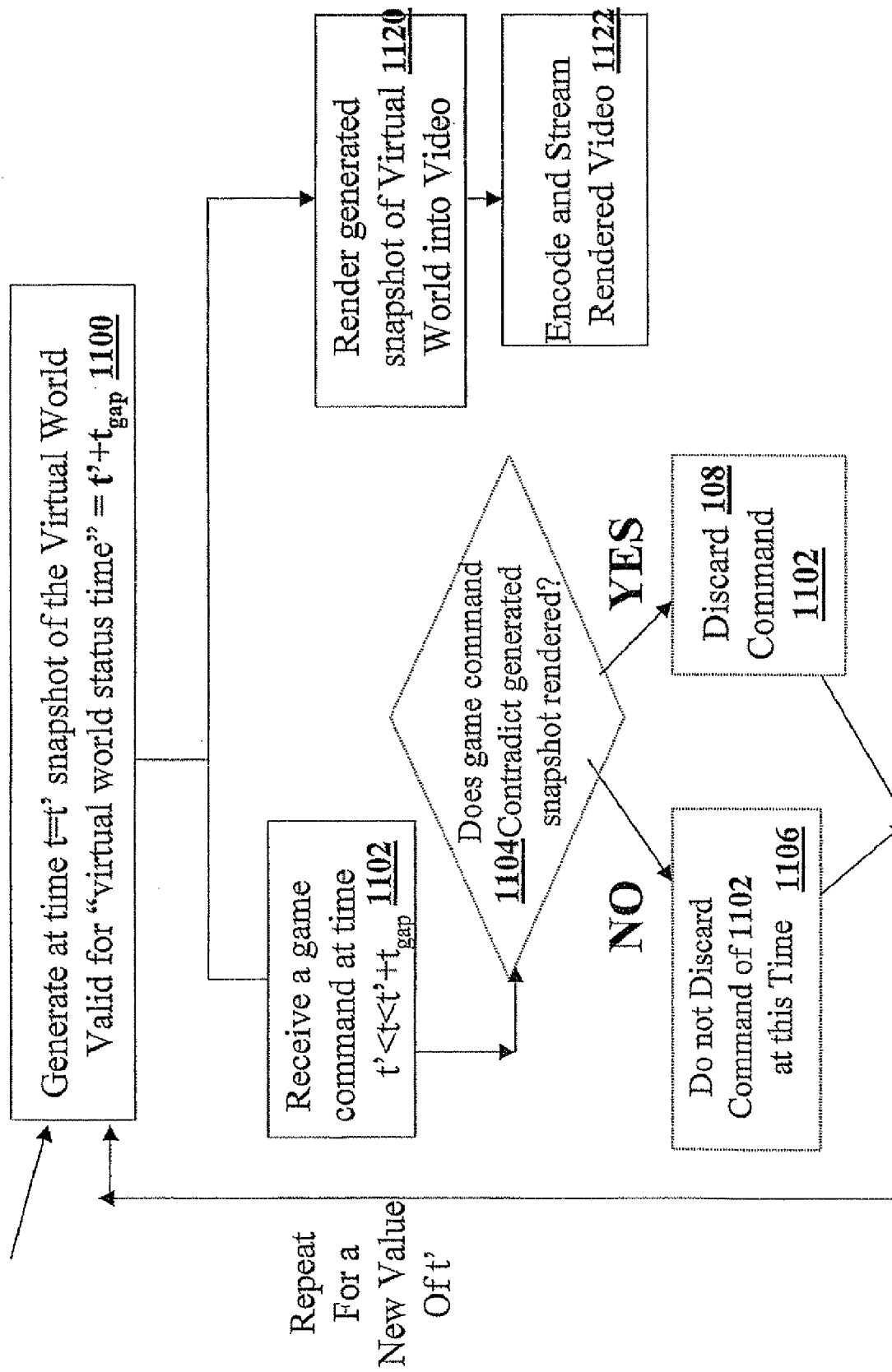
FIGS. 5C-5D provide flow charts of exemplary techniques for 'future snapshots' of a virtual gaming universe.

Description of FIG. 5C and Gap Time

Reference is now made to FIG. 5C which describes a routine for generating and rendering video frames for a virtual gaming universe. In step 1100, a snapshot of the virtual universe reflecting a "future state" of the virtual universe is generated at time t' for a "virtual world status time" that is equal to $t'+t_{gap}$. Although not a limitation, typically is a $t_{gap}$ predetermined value, may be determined in accordance with a frame rate of the video. The "frame rate" is the number of frames per second. The inverse of the frame rate is the time between frames ($t_{frame}$). In applications where video is transmitted through a multiple access network and/or a switching network and/or a wide area network, $t_{gap}$ may be at least on the order of magnitude of the $t_{frame}$ (say, at least $0.2 * t_{frame}$, or preferably, at least $0.5 * t_{frame}$).

In one non-limiting example, 15 to 40 frames of video are served to a mobile device (mobile phone and/or PDA), and $t_{frame}$ is between 25 and 65 milliseconds, and $t_{gap}$ is at least. Though not a limitation, typically $t_{gap}$ is approximately equal to $t_{frame}$ (for example, within 50%, or within 30%—i.e. $|t_{frame}-t_{gap}|/|t_{gap}|<0.5$ or $|t_{frame}-t_{gap}|/|t_{gap}|<0.3$) and the user is thus served video "one frame ahead."

After the snapshot (for example, a data structure representing the future state of the virtual universe) is generated, a video frame is rendered 1120 (for example, using a rendering engine 316) and encoded streamed 1122 to the client device.

Because an animated video sequence is generated, the generating of the snapshot 1100 is repeated, usual at intervals of $t_{frame}$.

It is noted that during the "gap" time (i.e. a time greater than t' and less than $t'+t_{gap}$), certain game commands may be received and/or made available for processing which 'contradict' the snapshot generated in step 1100. In one example, it may be determined that a bullet aimed at a gaming character will follow a trajectory to kill the gaming character, and that as of the time $t'+t_{gap}$, the gaming character will be dead. Thus, according to this example, a snapshot where this gaming character In the interim (i.e. after the time the snapshot is generated but BEFORE the time the gaming character would have been struck by the bullet and dies), a gaming command with a directive to move the gaming character to a "safe" location (i.e. where the bullet would not strike the gaming character) is made available (i.e. received and/or made available for processing). If the gaming engine processes this command by moving the gaming character to the "safe" location and allowing the gaming character to remain alive, this will contradict the video image that is send to one or more game users.

In order to avoid a contradiction between the video frame sent to users and the "game reality" maintained by the game engine, it is decided to discard game commands made available during the "gap time" (a time after t' and before $t'+t_{gap}$).

This may be seen in steps 1102-1104, 1106 and 1108 of FIG. 5C. If a game command is received during the gap time 1102, it may be discarded 1106, and if is it determined 1104 that the game command contradicts the snapshot (i.e. snapshot of the "future state") generated in step 1100.

Thus, the present inventor is disclosing that, surprisingly, it can be useful to forfeit a certain amount of "game integrity" (i.e. lost game integrity due to discarding of game commands) in order to provide a lower latency delivery of video to the screen of the client device.

Figure 5D:
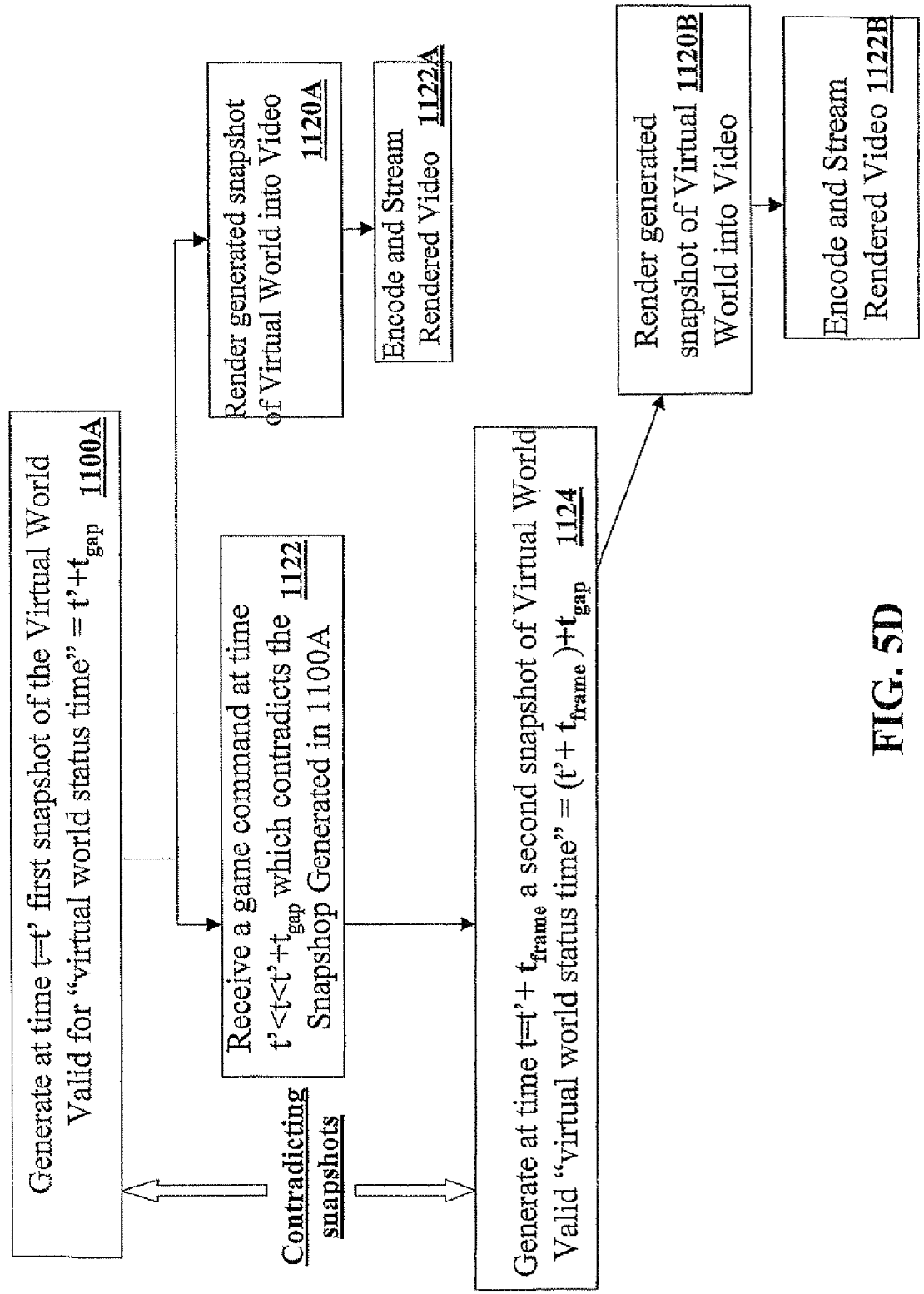

Description of FIG. 5D

According to embodiments described in FIG. 5C, game commands which contradict generated snapshot (i.e. handled during the gap time t>t' and t<t'+tgap) may be discarded so that the virtual world or universe is not modified in accordance with the discarded game commands. Nevertheless, this is not a limitation of the present invention.

Alternatively or additionally, it is not required to discard these contradicting game commands. Rather, these contradicting game commands may be used to modify the virtual world or universe in a manner in a way which contradicts the previously generated snapshot of the virtual world (i.e. which is rendered 1120, encoded and streamed 1122 to the client devices 112).

In one example, a "future" snapshot shows that a game character has been killed by a bullet. This "future" snapshot is sent to the client devices.

Nevertheless, after the future snapshot is generated, it turns out that game commands are received at a time t'<t<t'+tgap which moves the game character to a "safe" location. In the NEXT rendered frame, the game character is alive.

From the point of view of the user, the user first receives a video frame which shows the game character dead, and then a "contradictory" video frame which shows the game character alive (i.e. brought "back" to life).

It is appreciated that the approaches described in FIG. 5C and FIG. 5D may be combined—i.e. some game commands (according to some policy) may be discarded, while other game commands may be handled to modify the virtual world or universe, with a subsequent snapshot contradicting the first snapshot.

An Additional Discussion About Latency

The term 'assessed latency' may to any one of: predicted latency (for example, according to relative physical and/or network locations of the client and server) and measured latency. According to some embodiments, the latency is measured and/or predicted on an ongoing basis, and the 'gap time' or 'amount of time in the future for which a prediction is generated' is adjusted dynamically in reaction to a change in the assessed latency.

The latency can be different for different users.

A Brief Discussion of Differential Latency

It is noted that when there are more than one client devices, the latency of the different client devices may differ—i.e. differential latency. As discussed in the background section of the present disclosure, differential latency may adversely affect user-perceived game fairness.

Figure 6A:
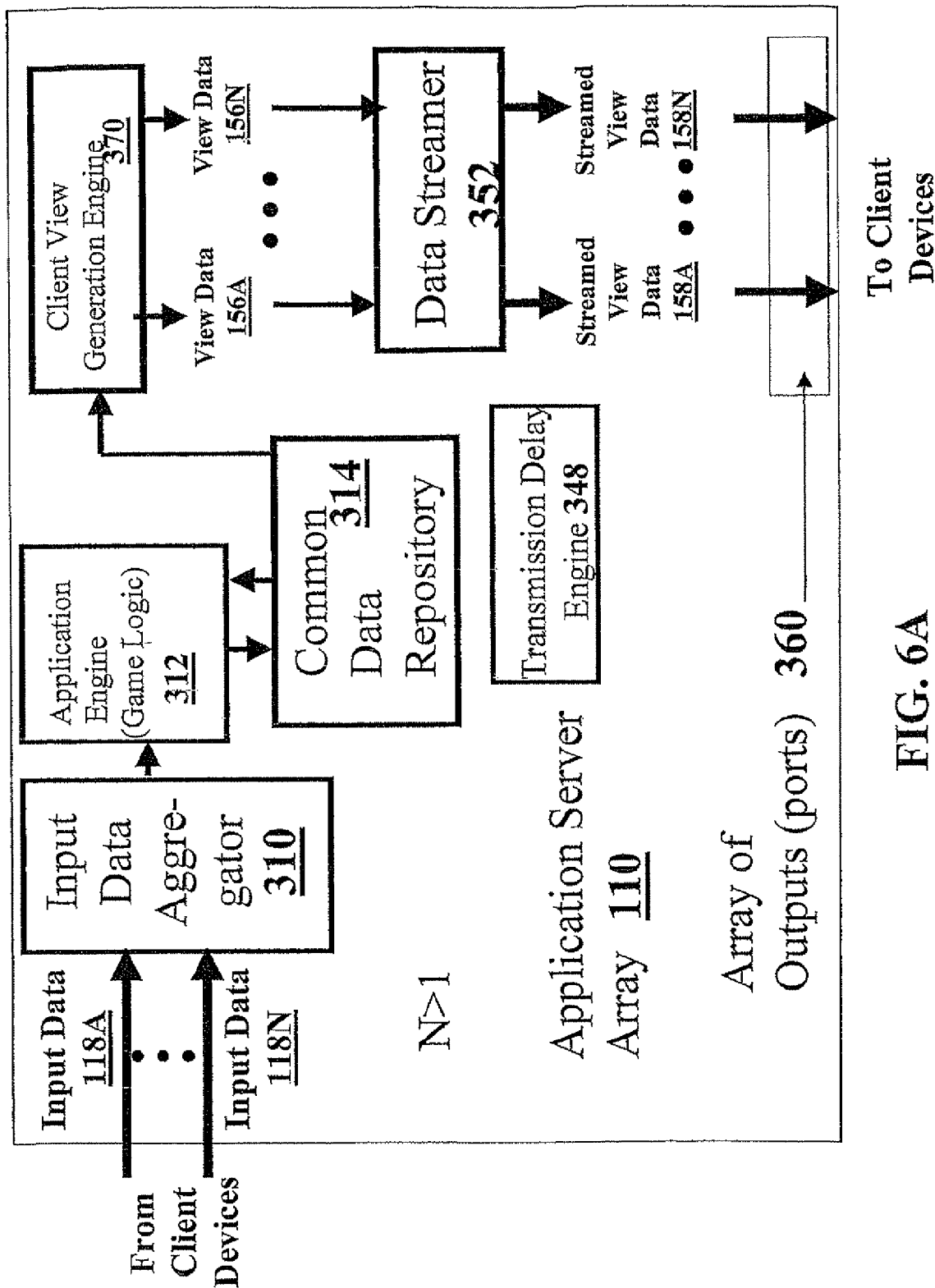
FIG. 6A-6B provides block diagrams of application server arrays that include a transmission delay engine.
Figure 6B:
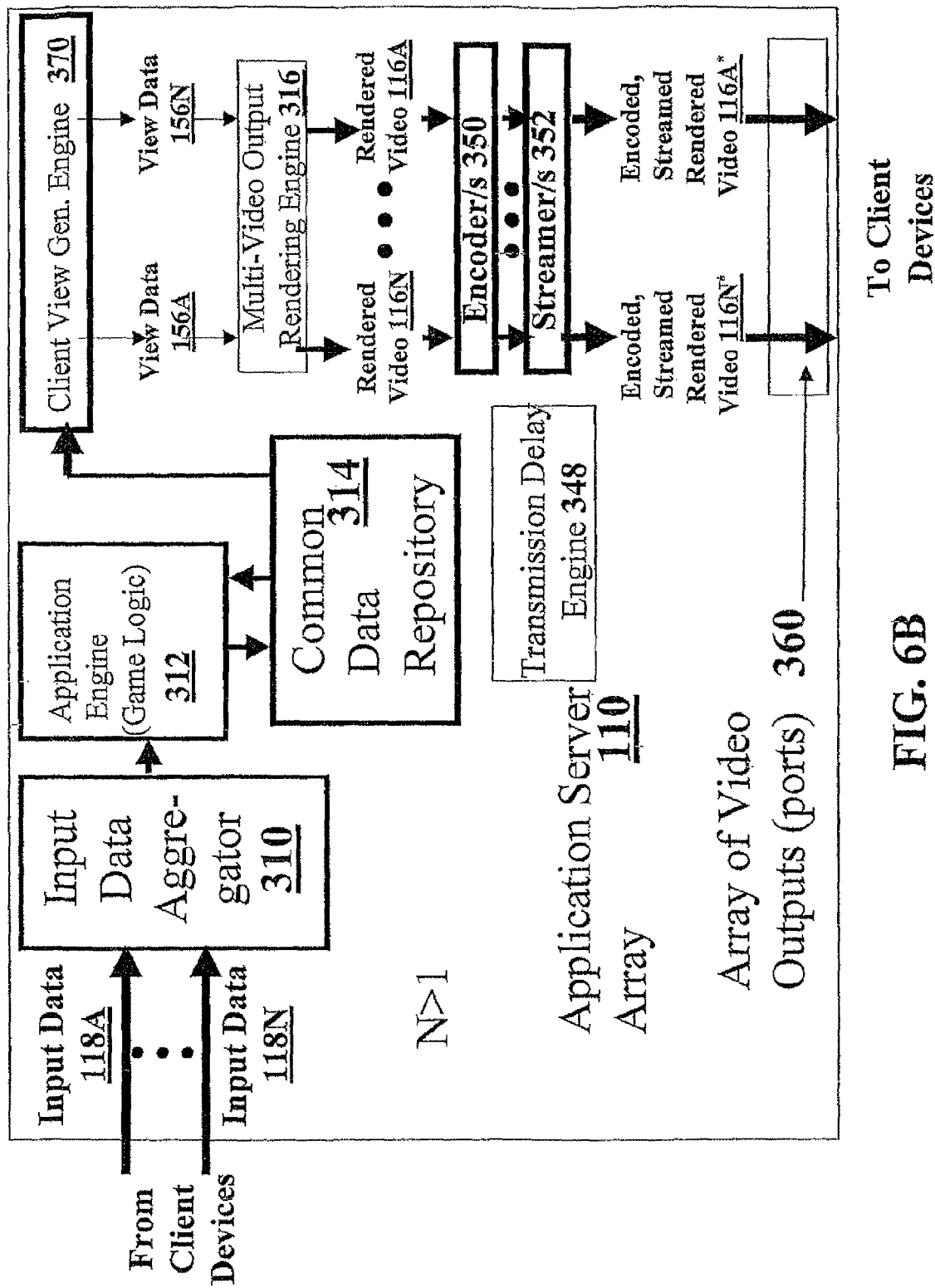

Towards this end, in one example, an onboard transmission delay engine 348 is provided on the server side (in the example of FIG. 6B, in a system where view data is rendered on the server side; in the example of FIG. 6A, in a system where unrendered data is served to the client devices).

In the example described earlier, the game server is located in Tel Aviv Israel and client devices are located in Haifa, Israel and Boston, Mass. and the latency to the Boston device significantly exceeds the latency to the Haifa device.

According to this example, the transmission delay engine will delay the sending of view data to the Haifa device while view data to the Boston device will be sent immediately after it is generated—this could eliminate any unfair advantage enjoyed by the Haifa device (i.e. which would receive pertinent snapshot data earlier).

This delay may be computed in accordance with assessed latency data for the various devices.

Alternatively or additionally, the view data may be associated with an instruction to delay display on the client device. Thus, in the present example, the view data (or rendered video frames) would be sent to the Haifa device with instructions not to display the images immediately—rather with instructions to delay display on the client side. This delay could be calculated on the server side in accordance with assessed differential latency and then sent to the client device.

Figure 7A:
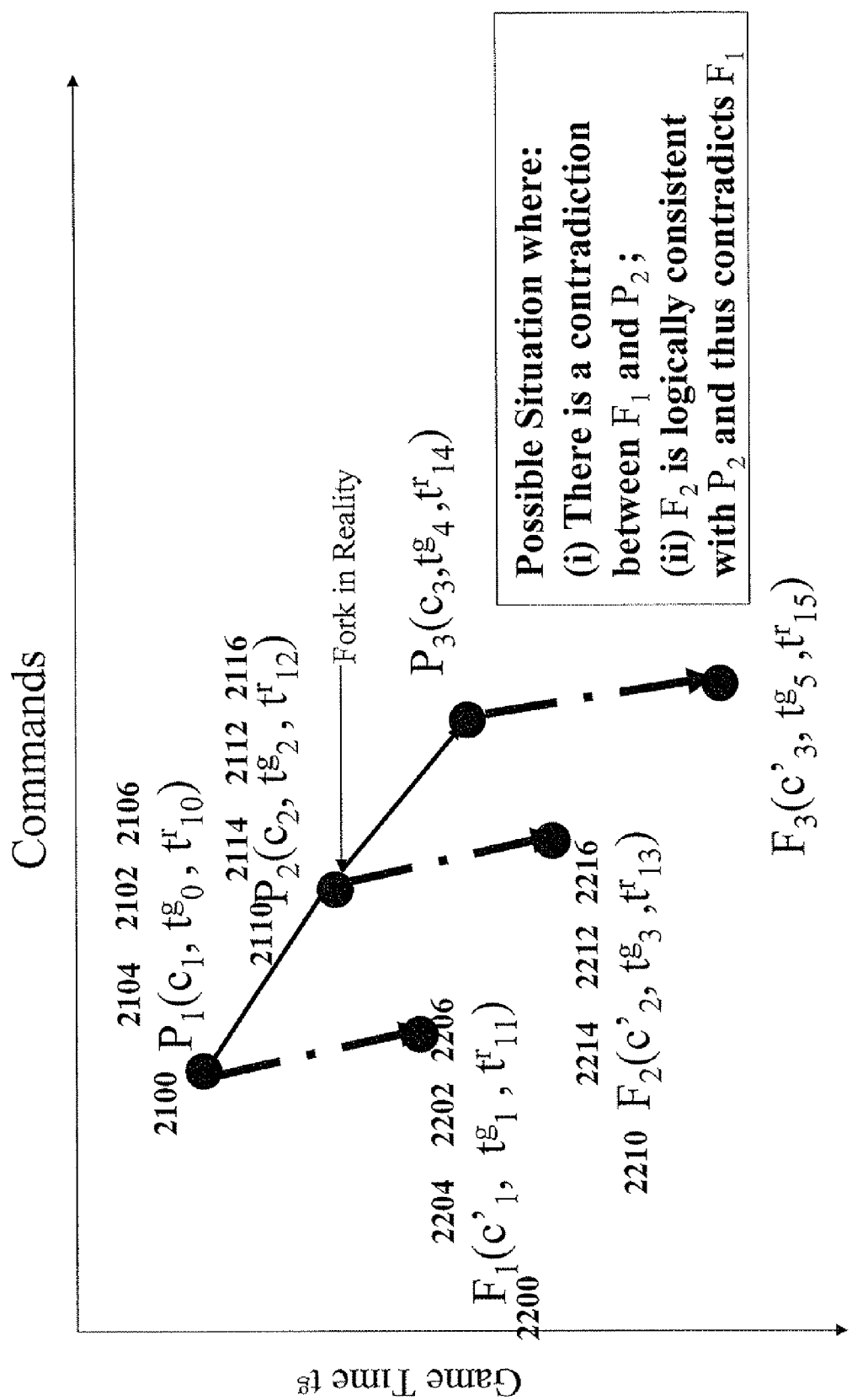
Figure 7B:
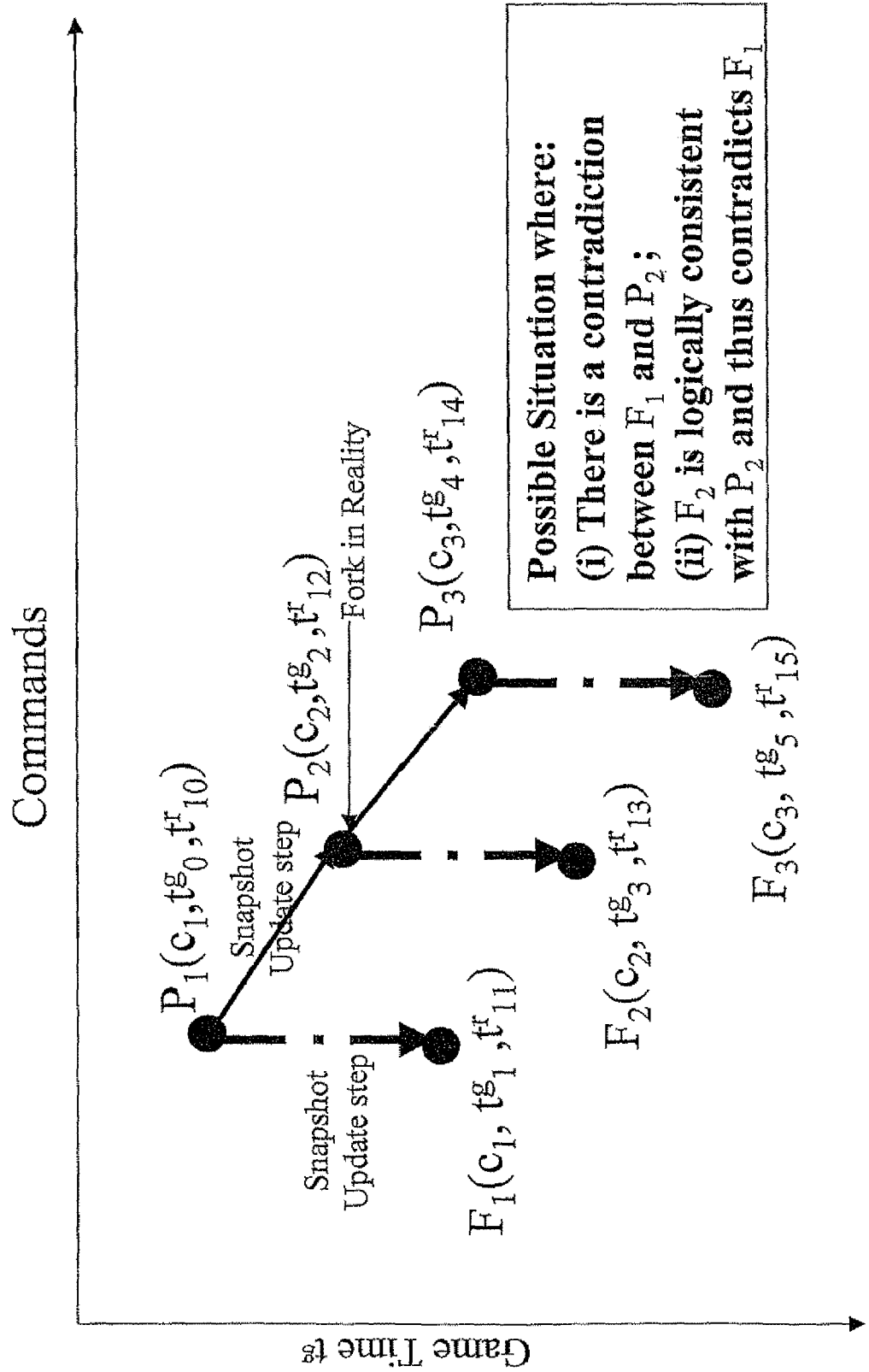

A Technique for Generating "Future Snapshots"—a Discussion of FIGS. 7A-7C; 8

FIGS. 7A-7B describes an exemplary technique for generating snapshots of a virtual universe in accordance with some embodiments of the present invention.

As already discussed with reference to FIG. 4, at various instances in 'game time' the virtual universe may be updated—in particular, a 'later snapshot' of the virtual universe (i.e. one or more aspects thereof) may be generated by the game engine 312 from an earlier snapshot by applying game logic or game rules. In the example of FIG. 4, a game rule related to motion of a game object 2250 within the virtual universe at a given velocity. Thus, it was possible to derive later snapshot 2720 from earlier snapshot 2710 (i.e. in a given snapshot update state) using (i) data describing the virtual universe in earlier snapshot 2710 (at the game time for which earlier snapshot 2710 describes the state(s) of one or more objects in the virtual universe); and (ii) game logic or game rules describing the time development of one or more gaming objects in the virtual universe. In the example of FIG. 4, only gaming logic accounted for the discrepancies between state of the object 2750 in frame 2710 and state of the object in frame 2720—i.e. no data external to the virtual gaming universe (for example, gaming commands received from users for controlling one or more gaming characters) was injected into the virtual universe.

It is understood that if a user-controlled gaming character would have 'pushed' the object and the 'push command' would have been 'applied' during a given 'step' or frame transition (for example, between a given pair of snapshots) then a later snapshot would have been different.

Thus, it is noted that in a more general case than that described in FIG. 4, the virtual universe (i.e. the state of one or more gaming objects within the virtual universe) may be modified going forward in time (i.e. by gaming engine 312) not only by (i) applying game rules to so-called 'internal' data (i.e. state data of the object(s) of the gaming universe at the time of the earlier snapshot) but also by introducing into the virtual universe (i.e. when 'stepping' between the earlier snapshot and the later snapshot), 'external' data—for example, command data received from a user.

FIGS. 7A-7C, 8 describe an exemplary technique for generating 'future snapshots' for reducing gaming latency in accordance with some embodiments of the present invention.

In FIGS. 7A-7B the various snapshots of the virtual universe are described on two axes—the X axis is the set of commands cumulatively applied (i.e. when introduced into the virtual gaming universe) by the gaming engine to generate a snapshot of the virtual universe and the Y axis is the game time $t^g$.

It is noted that, for certain 'steps' forward in time, gaming commands are introduced into the virtual universe and the 'later' snapshot describes a state of a virtual universe with more 'external information' (i.e. game command data) introduced into the virtual universe than the 'earlier snapshot.'

Thus, the command set of snapshot $P_2$ is 'larger' than the command set of snapshot $P_1$—i.e. the command set includes at least one 'extra command.' Thus, it may be said that snapshot $P_2$ contains 'extra information introduced from outside of the virtual universe into the virtual universe.' Similarly snapshot $P_3$ contains at least one extra command in the game command set (i.e. total cumulative or historical set of gaming commands applied to the virtual universe for which snapshot $P_3$ describes at least one aspect).

Although not a requirement, in one example, snapshots $P_1$, $P_2$ and $P_3$ represent a 'current state' of the virtual gaming universe that is maintained in the common data repository 314 in the application server array 110.

Snapshots $F_1$ and $F_2$ are predicted or 'future' snapshots. Thus, $F_1$ represents a 'predicted state' of the virtual universe at game time $t^g_1$ based on external information that has already introduced into the virtual universe when generating parent frame $P_1$ (at game time $t^g_0$) (for example, including at least game command set $c_1$). Optionally, future snapshot $F_1$ may also reflect one or more additional commands (i.e. commands of command set $c'_1$ that are extra relative to command set $c_1$).

In the example of FIGS. 7A-7C, snapshots $P_1$, $P_2$ and $P_3$ represent a 'current state' and snapshot $F_1$ may be referred to as a 'future' or predicted snapshot because: (i) the game time of snapshot $F_1$ is later than the game time of snapshot $P_1$ (i.e. snapshot $F_1$ is 'farther in the future' than the next 'representative' snapshot $P_1$; and (ii) the next snapshot $P_2$ thus has at least one extra piece of 'external information' introduced into the virtual universe (i.e. one extra game command in the game command set) that is not available to predicted or 'future' snapshot $F_1$.

This is because 'future' or 'predicted' snapshot $F_1$ describes a 'predicted future state of the virtual universe' before one or more subsequently-applied (and/or subsequently available) game commands are applied into or introduced into the virtual gaming universe. In frame $P_2$, the 'real' information is available that was not available or not used when making prediction of snapshot $F_1$.

It is noted that in FIG. 7A, two different snapshots (i.e. $F_1$ and $P_2$) are derived from $P_1$—the predicted snapshot $F_1$ and the next 'parent' snapshot $P_2$ (for example, the next 'current' snapshot).

Typically, future or predicted snapshot $F_1$ is generated before snapshot $P_2$. This is because it may be desirable to generate a snapshot using all 'external information' or 'command data' introduced into the virtual universe or available at a given time.

In the example of FIG. 7B, the game command set of the $c'_1$ future frame is identical with the game command set of the parent frame $c_1$. Thus, in the example of FIG. 7B, the line between $P_1$ and $F_2$ is vertical.

Extra Commands

It is noted that as stated above, snapshot $P_2$ includes at least one 'extra' command that is not introduced into future snapshot $F_1$. FIG. 7C describes several examples of where this is the case. In Example 1, the command set of $F_1$ includes a C(1) command (i.e. a type of command) and a C(2) command, while the command set of $P_2$ includes an extra type of command—i.e. C(3). In example 2, the command set of $P_2$ includes an extra instance of a C(2) command. In example 3, the command set of $P_2$ includes a type of command not found in the command set of $F_1$. In example 4, the command set of $P_2$ includes an extra instance of a C(1) command.

Contradictions

It is noted that FIG. 5D described a situation where contradictory snapshots are sent from the application server array 110 to one or more client devices.

It is possible to produce this effect using the technique of FIGS. 7A-7C. In particular, it is noted that the game command set of $P_2$ includes at least one extra command relative to the game command set of $F_1$. In 'optimal' situations, the extra one more commands of command set $c_2$ does not contradict the snapshot of $F_2$.

In one example, two gaming characters are fighting—character A and character B. The 'extra command' relates to character B reloading his gun (but not firing) in a 'concealed' manner—i.e. not viewable by character A. Thus, in this example, the future snapshot $F_1$ does necessarily contradict snapshot $P_2$ from the point of view of character A showing a view of character B. Thus, in this example, by providing the 'future snapshot' it is possible to reduce game latency without adversely impacting the game integrity presented to the user. Thus, this example differs from the case discussed with reference to FIG. 5D.

In another example, related to FIG. 5D, there is indeed a contradiction between presented snapshots or frames in accordance with the game rules or game logic enforced by gaming engine 312. Thus, for example, in the future frame $F_1$, it is predicted that gaming character 'B' will stand in a given location within the virtual gaming universe and the frame is presented with gaming character 'B' alive and in the certain location. In reality, however, a command from gaming character 'C' is processed (i.e. where gaming character 'C' fired upon gaming character 'B') and introduced, as part of command set $C_2$. Application of this extra game command (i.e. that is the extra command in game command set $C_2$ and not in game command set $C_1$) causes gaming character 'B' to die or be eliminated at gaming time—thus our prediction was 'wrong.'

Unfortunately, the predicted snapshot $F_1$ sent to the client device for presentation to a user contradicts the 'correct' version—i.e. it is impossible, according to the game rules of the game engine for character 'B' to be 'dead' at an earlier game time $t^g_2$ but to be alive at a later game time $t^g_1$ (in this present example, the game engine does not permit 'resurrections' or at least not in this time frame).

Thus, in our example, it is necessary to generate another 'future frame' $F_2$ from $P_2$ which contradicts, according to the rules enforced by the game engine, the earlier 'future frame $F_1$. When the later frame is presented to a user (i.e. on a display screen of a client device 112), this 'contradicts' an earlier presented view frame. Thus, the user of the client device will first see a situation where character 'B' is alive at game time $t^g_1$, but later see a snapshot or view $F_2$ (i.e. associated with game time $t^g_3$) that indicates that the earlier snapshot $F_1$ was a 'lie.' This could include, for example, a description of a situation where gaming character 'B' has been dead for a time that exceeds ($t^g_3-t^g_1$) (for example, a decomposing body or maybe the game could alphanumerically display the 'time of dead' on the corpse of a dead gaming object or gaming character).

Predicted Point of View

It is noted the that aforementioned 'future frames' or 'future snapshot' described in FIGS. 7A-7B (i.e. $F_1$; $F_2$; $F_3$) are calculating from a predicted or 'future point of view' of a gaming character within the virtual universe. The future snapshot (i.e. unrendered as in FIGS. 2A-2C or rendered as in FIGS. 3A-3C) may then be sent to a client device 112 associated with the gaming character. In one example, this is carried out for a plurality of gaming characters, each gaming character associated with a respective client device that generates commands for controlling the gaming character.

Figure 9:
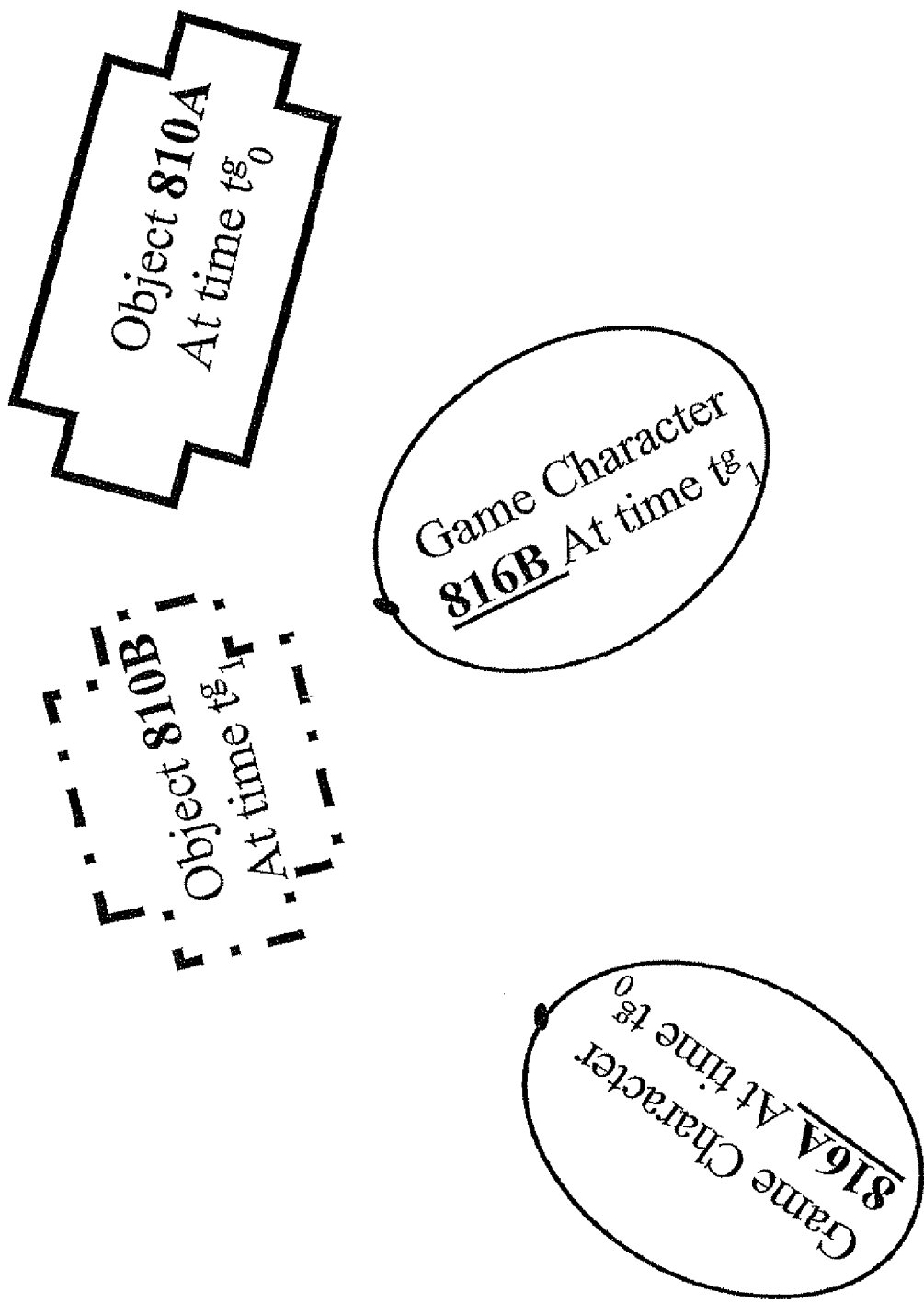
FIG. 9 provides a diagram of a game character and a game object within a virtual universe accordance to one example.
Figure 10:
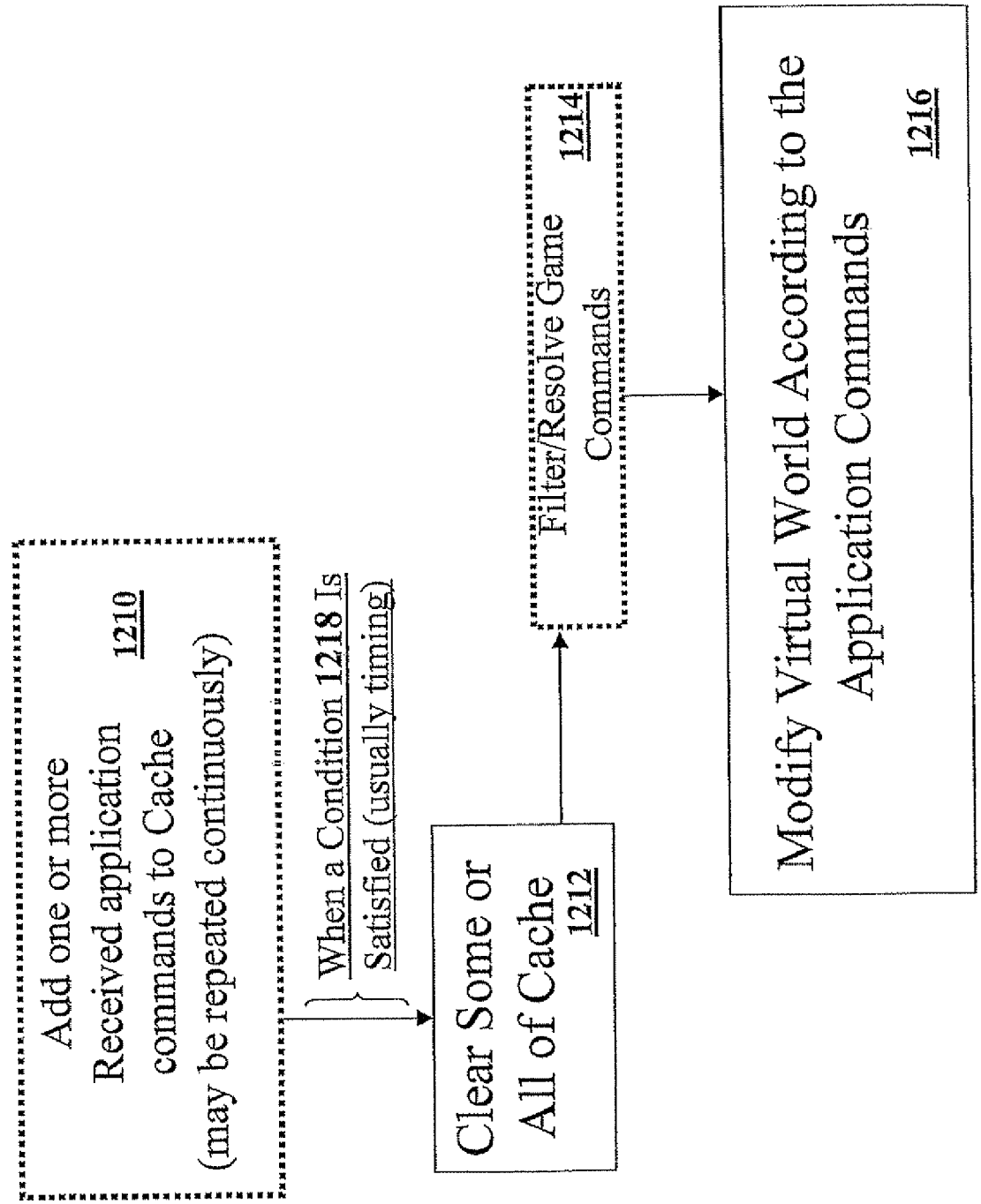
FIG. 10 provides a diagram of a technique for caching game commands in accordance with some embodiments of the present invention.

The concept of 'predicted point of view' is now discussed with respect to the non-limiting illustrative example provided in FIG. 9. According to this example, the game character for which it is desired to generate a snapshot (i.e. relative to the 'eye of the game character or the 'point of view of the game character') has a position and orientation 816A at time $t^g_0$. It is predicted by the game engine 312 (i.e. using the game rules) that at time $t^g_1$ the game character will have a future position and orientation (i.e. at time $t^g_1$) that is depicted by 816B.

In the example of FIG. 9, the 'field of view' or 'point of view' includes object 810 which has a position and orientation 810A at time $t^g_0$ and is predicted (i.e. by game engine 312 using the game rules) to have a position and orientation 810B at time $t^g_1$.

In one non-limiting example, the object 810B is another gaming character other than gaming character 816.

A future view (i.e. of snapshot $F_1$) of the gaming universe relative to use-controlled gaming character 816 is sent to the client device 112 which controls gaming character 816. This snapshot $F_1$ requires 'point of view data' about gaming character 816 itself since the view is computed relative to a future state 816B (i.e. predicted from game time $t^g_1$) of the given gaming character 816—it is evident that view of object 810 from the 'future' location/orientation associated with 816B may be different from the view of object 810 from 'present' location/orientation associated with 816A.

Thus, in order to compute the predicted 'future' snapshot $F_1$, both 816B and 810B must be determined. The future snapshot $F_1$ may be computed in accordance with a relationship between the future state of both the 'viewer' gaming character 816 and the 'viewed' object 810. In one non-limiting example, this relationship is determined in accordance with a future position and/or orientation of the 'viewer' gaming character 816 and the 'viewed' object 810.

Although the example of FIG. 9 related to physical position and orientation as examples of 'state data' of a gaming character and game object, this is not intended as a limitation, and other examples of predicted 'future state data' for an object and/or gaming character may be used. In one example, a gaming character's eyesight (i.e. the strength of the eyesite—i.e. how far the character may se) is predicted for the future frame. In this example, it is predicted that the gaming character will have two 'healthy eyes' and a snapshot $F_1$ is associated with the two gaming 'healthy eyes' is generated and sent to the client device 112 $F_1$ for presentation to the user.

Unfortunately, command set $c_2$ includes a command indicating that the character's eyes were damaged at time $t^g_1<=$time $t^g_2$. Thus, according to this example, the next future frame $F_2$ corrects this 'mistake.'

Figure 8:
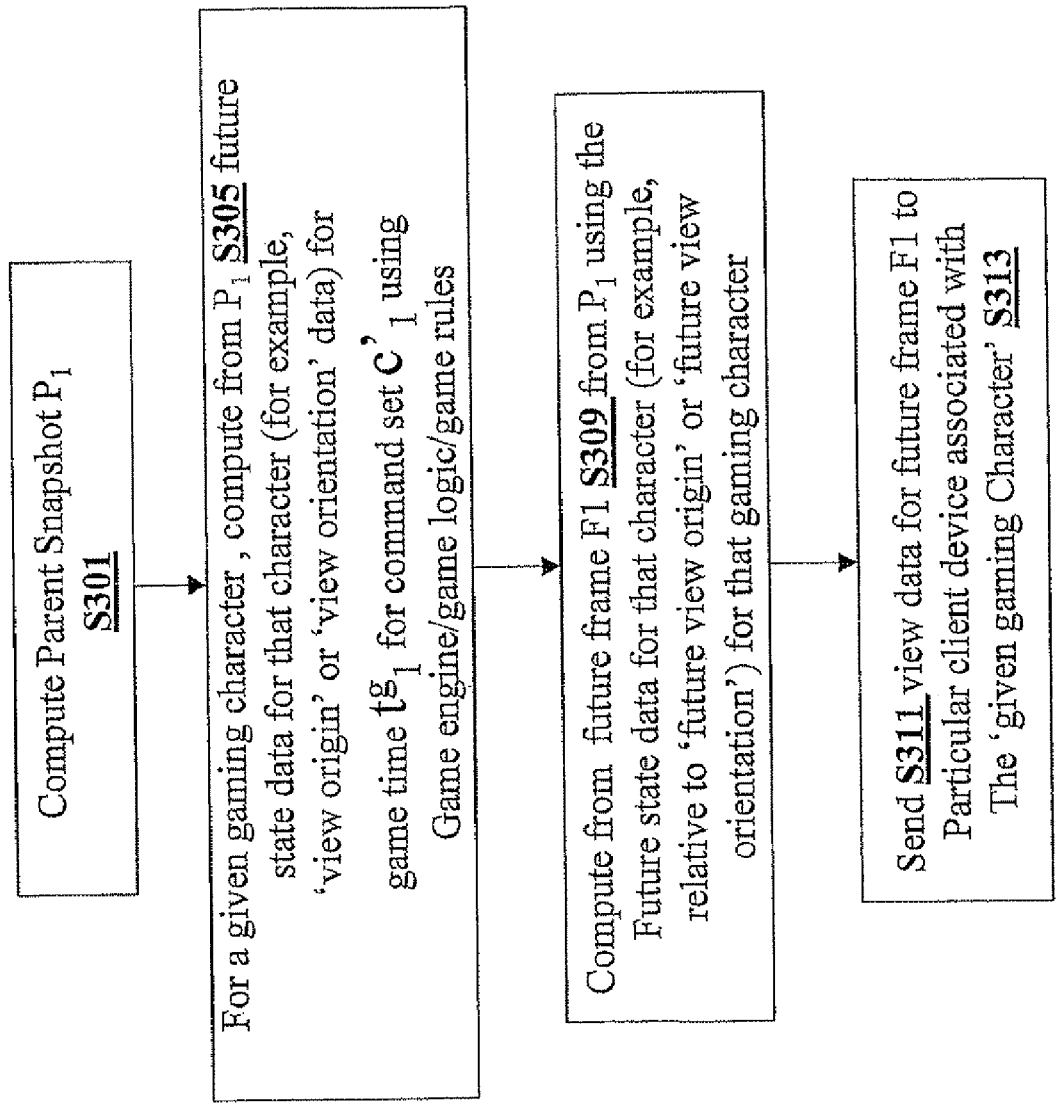

FIG. 8 provides a flow chart of an exemplary technique for computing frames or snapshots in accordance with some embodiments of the present invention.

Exemplary Implementation of Techniques for Reducing and/or Eliminating Latency

In one example, it is noted that the technique described in FIGS. 7A-7C; 8; 9 (and in accompanying text) may be implemented using a plurality of processes—one 'fast process' for 'future predictions' and another 'slower process.' There may be any number of 'fast processes.' At different points in time, data may be copied between processes. This technique will be described in the next section for the particular example of a dual-core processor. It is appreciated that this is not a limitation in any way whatsoever—the processes may reside on a single machine or on multiple machines in any architecture. Furthermore, it is noted that the technique may also implemented using a single process.

According to some embodiments, it is possible to simultaneously render future frames indicative of a forecasted future state of the virtual world and current frames indicative of a current state of the present state of the virtual world using a multi-core processor.

In this implementation, data indicative of the virtual world is stored in a memory accessible by both core processors (i.e. common data repository 314), and each processor writes, at different rates, respective results of rendering operations into a respective memory (i.e. memory containing rendered frames, or "rendered frames memory") associated with each processor.

Thus, according to one implementation, one core (i.e. operating at lower clock rate) renders frames at a "normal" rate while the other core (i.e. operating at higher clock rate) renders future frames (for example, y frames ahead) at a rate y times faster, where y>1.

Thus, the slower core renders "present" frames (i.e. indicative of a present state of the virtual world of the common data repository 314) while the faster core renders "predicted frames" that give an approximation of the future and may be served to client devices to reduce rendering latency at the client device.

In order to prevent the faster core from getting "too far ahead" of the slow processor (i.e. to increase the value of $t_{gap}$ as more frames are rendered), it is possible, periodically, for the faster core to copy the contents of the "rendered frames memory" associated with the slower processor into the "rendered frames memory" associated with the faster processor.

The contents of the "rendered frames memory" of the slow and/or faster processor are forwarded to encoder 350 for encoding and streaming to the client device. Thus, the 'future' video periodically reverts to the 'actual' situation.

Another Technique for Reducing Latency

The aforementioned technique of rendering a snapshot of a "future" frame may be useful for reducing user latency.

Alternatively or additionally, the technique described in the current section may be used.

Traditionally, the rate at which video frames are rendered is equal to the rate at which these video frames are served and/or presented. Thus, in prior art systems where video frames are rendered within 4 milliseconds, 250 frames per second may be served. In prior art systems where video frames are rendered within 10 milliseconds, 100 frames per second may be served.

The present inventor is now disclosing for the first time that a user latency may be reduced by rendering individual video frames "faster" than that required by the frame rate by a given number. In one non-limiting example, if 25 frames are served per second, it is required to render individual frames within 40 milliseconds. The present inventor is disclosing that if one renders individual frames within a shorter period of time than required by the frame rate, it is possible to reduce a user latency. Thus, according to the current non-limiting example, individual frames, which must be rendered in no more than 40 milliseconds, are rendered within, for example 20 milliseconds, or 10 milliseconds, or 4 milliseconds.

This technique may be particularly applicable in a switching network and/or a wide area network and/or a multiple access network and/or a local network where it is desired to reduce user latency. Furthermore, this technique may be particularly applicable in systems where video frames need to be served at a "moderate" rate (i.e. 15-50 frames/second), for example, gaming systems playing on PDAs or cellular devices or devices in a cellular network.

Thus, according to exemplary embodiments, the following steps are carried out:
- A) Rendering a plurality of video frames, each said video frame rendered in less than a first number (i.e. X1) of seconds;
- B) Serving and/or presenting said rendered video frames at an average rate whose value is a second number (X2) of said rendered video frames per second,
- Wherein a ratio between a reciprocal of said first number and said second number is at least a ratio number whose value is at least 2.

In some embodiments, the value of the ratio number is at least 5, or at least 7, or at least 10.

Caching of Game Commands and/or Application Commands

In some embodiments, the data representation of the virtual universe (i.e. in the common data repository) is modified "just in time"—i.e. as game commands (or data indicative thereof) are received from the client devices 112. Nevertheless, this is not a limitation of the present invention. In some embodiments, game commands (or alternatively, commands related to ANY application other than a game, including but not limited to ERP systems) may be received, and stored in a "command cache" and not immediately "applied" to the virtual application universe (for example, virtual gaming universe).

Referring to FIG. 6, it is noted that instead of applying game commands (or commands for any other application) "one by one" (i.e. one at a time), game commands may be received and first stored 1210 in a command cache (not shown) for a period of time (or until a specific condition is satisfied 1218). At that point, some or all game commands may be cleared 1212 from the command cache, and the virtual world or universe (for example, the virtual gaming universe) may be modified 1216 in accordance with the previously cached application (typically gaming) commands. Optionally, game commands may be filtered 1214, or contradictory game commands may be resolved before the virtual world or universe is modified in accordance with "surviving" game or application commands.

For example, a command to move to the left and a command to move to the right may 'cancel each other out' (or contradict) and be filtered.

This even refers to 'legally valid' commands according to game engine 312 logic.

Thus, instead of modifying the virtual world or universe (i.e. gaming universe or world) immediately upon receiving application commands (i.e. game commands), application (for example, game) commands are first cached (in a command cache or data cache) for a certain period of time, and then, after the "cache delay" (i.e. amount of time the commands are stored in the cache), virtual world or universe is modified in accordance with the game commands.

This may be useful for a number of reasons:

A) Application and/or Game Fairness

When providing a multi-player gaming service in a network where the latency (i.e input latency—time it takes to receive input) of different client devices may vary, it may be important to maintain a "fairness policy." In one example, an application server array is maintained in Israel, and there are client devices in Israel and in the United States. According to this example, the time it takes the application server array in Israel to receive data indicative of game commands from client devices located in Israel is much less than the time it takes the application server in Israel to receive data indicative of game commands from client devices located in the United States. If the virtual gaming universe were to be modified in a "just in time manner" as game commands are received at the application server, users of client devices in Israel could enjoy an unfair advantage—their 'reactions" to the game situation would be received faster.

According to one example where the application server is in Israel but there are client devices both in Israel and in the United States, at t=100 command "A" is received at the application server in Israel from a client device in Israel (the user in Israel generated command "A" on his client device at time t=99.5). At t=101, a command "B" is received at the application server in Israel from a client device in Israel (the user in the United States generated command "B" on his client device at time t=99). If commands are processed as received, the virtual world would first be modified in accordance with command "A," then in accordance with command "B," giving an unfair advantage to the user who sent a command later.

In order to obviate this situation, it is possible to cache game commands (or commands for other applications) before modifying the virtual world. The cached commands may then be handled "as a group"—for example, by pre-processing before modifying the virtual world according to the cached game commands.

For example, in order to provide a "fairness" policy, the time that game commands were generated may be estimated or determined (for example, by estimating a latency and/or by sending the game commands with a time stamp), and "previously generated" (or game commands estimated to be previously generated) may be given priority—i.e. the virtual world may be modified first using game commands with "priority."

Thus, in some embodiments, an order in which application and/or game commands are "applied" to the virtual universe is determined in accordance with the game command client device network latency. The device network latency of a given client device 112 is the latency and/or estimated latency between a given client device 112 (or the estimated latency) and the application server. It is noted that this may vary in time as a function of the quality of the network connection between the client device and the application server. The "game command client device network latency" of a given game command is the device network latency (real latency or estimated latency) of the device that generate the given game command at the time the given game command was generated.

Thus, by maintaining this "fairness policy" the order in which game commands are "applied" to the virtual universe (the order in which the virtual universe is modified in accordance with the respective game commands) is not necessarily the order in which these game commands are received at the client device.

In some embodiments, the condition 1218 is based on pre-determined parameters (determined, in accordance with network parameters). Alternatively or additionally, the condition 1218 may be determined dynamically (for example, in accordance with the time stamps of the received commands), and may also vary as a function of time. In one example, as network congestion increases, the timing condition requires clearing of buffer and application of commands to the virtual world or universe after a longer period of time.

B) Scalability

There are many situations where game commands are determined to be irrelevant and/or there may be "contradicting" game commands. Irrelevant game commands may include commands that are generated at a first point in time and received at the application server a later point in time, but have become "irrelevant" in the interim. One non-limiting example of an irrelevant game command is a command that a user sends when a user's game character is alive, but by the time the game command is received at the application server, the user's game character is dead (the user's character was dead or 'destined' to be dead at the time the user generated the game command).

In order to provide better scalability and to reduce the computational resources required to provide a gaming server to a large number of players simultaneously (for example, at least 1,000 or at least 10,000 players it may be desired to filter "irrelevant" and/or substantially irrelevant and/or contradictory game commands that have been stored in a command cache before modifying the virtual world in accordance with the commands.

In some embodiments, a new protocol is provided (and methods and systems for implementing his protocol—i.e. on the client or server end—is provided) where game commands are associated with a frame for which they are generated. This will allow for a greater sense of 'fairness.'

Figure 11:
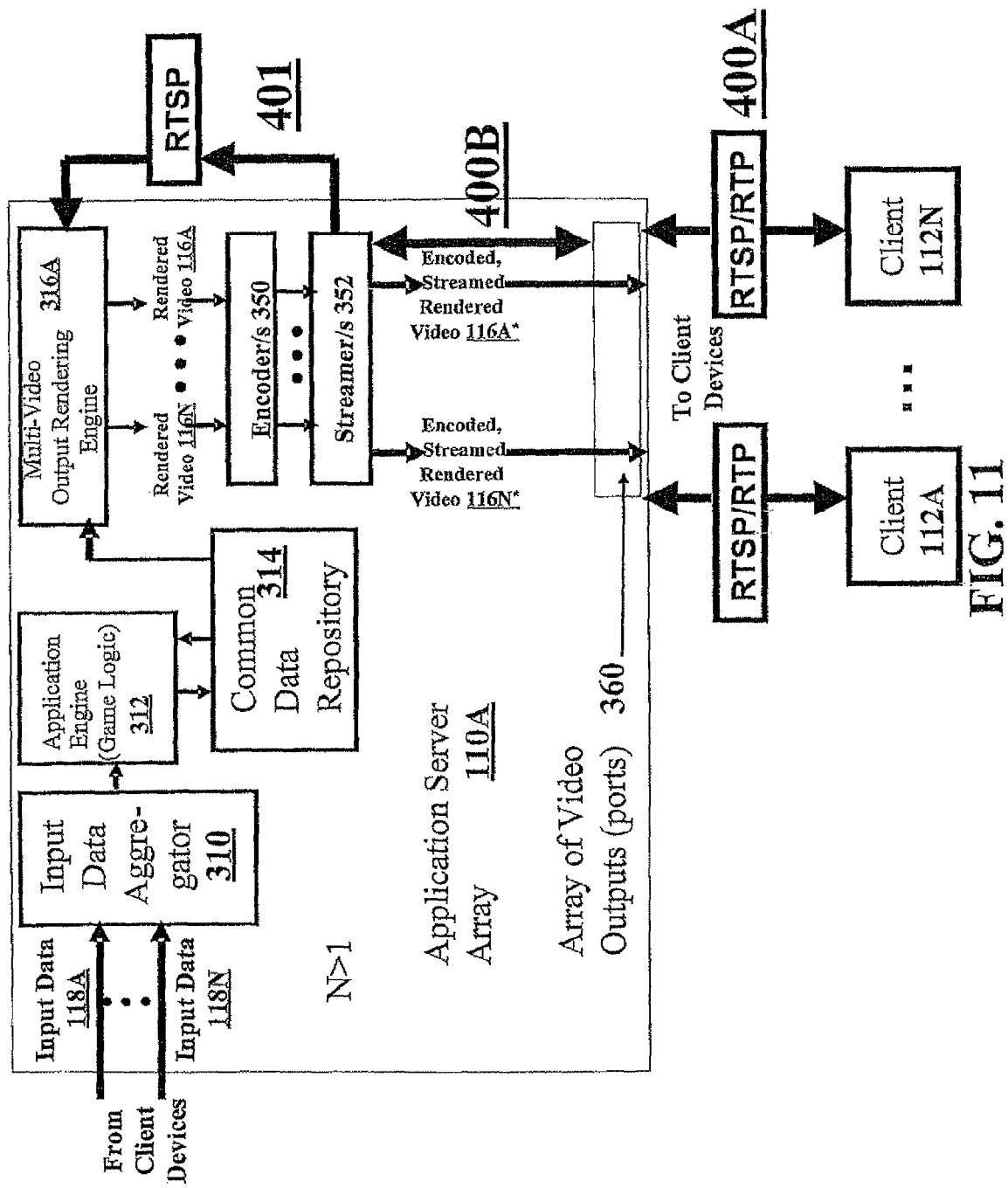
FIG. 11 provides a block diagram of a game application server where video is rendered on the server in accordance with device characteristics of a respective target client device to which video is serverd.

A Technique for Adapting Computer-Generated Graphics' Details and Video Characteristics to the Real-Time Presentation Capabilities of the Display Device and its Environment—a Discussion of FIG. 11

FIG. 11 provides a block diagram of an exemplary multi-player interactive gaming system in accordance with some embodiments of the present invention. In FIG. 11, the server array streams video streams 116 adapted in accordance with the display/graphics capabilities of the client device 112.

In exemplary embodiments, not every client device 112 has identical graphical display capabilities/resources. In particular, the plurality of client devices includes at least two client devices (i.e. client 112A and client 112N) which are configured to have different display capabilities.

In one example, clients 112A and 112N are different models of cell phones. For example, client 112A may be a "high end" cell phone with high pixel resolution (and configured to display a high number of frames per second) and a larger screen while client 112N may be an "entry level" cell phone with more primitive display features.

In another example, clients 112A and 112N may be identical devices but client 112A is configured (for example, in accordance with user preferences) to provide more sophisticated display capabilities, while client 112N is configured to provide more primitive display capabilities (for example, in order to conserve battery power).

In another example, client 112A is a cellular telephone and client 112N is a notebook or desktop computer. Certain individual users play the same game using multiple client devices—for example, using the cellular telephone while traveling on a bus or train, and the desktop or laptop when they arrive home or at the office.

It is noted that the respective encoded video stream 116' streamed by streamer 352 to each client device 112 is provided or "customized" in accordance with the respective display characteristics of each client device 112 that receives the video stream 116.

Rendering Individual Video Streams in Accordance with Display Characteristics of the Client Device In exemplary embodiments, the multi-video output rendering engine is operative to render individual video machine in accordance with display characteristics of the client device. Towards this end, data indicative of target device display capabilities may be provided to the multi-video output rendering engine 316A. Upon receipt of this data, multi-video output rendering engine 316 is operative to render each rendered video stream 116 in accordance with data indicative of the display characteristics of the target respective client device that is to receive the respective rendered video stream 116.

Exemplary device display characteristics include but are not limited to a device resolution, a device screen refresh rate, device contrast parameters, color parameters (for example, a number of colors), screen size and/or aspect parameters (for example, screen size or ratio between horizontal and vertical dimensions of the screen))

According to FIG. 11, data indicative of the respective display characteristics of each client device (for example, including but not limited to resolution parameters, refresh rate/refresh parameters, is communicated to the multi-video output rendering engine 316A, which generates each rendered video 116 in accordance with the received video.

In exemplary embodiments, the rendered video comprises a plurality of graphics objects all of which are not assigned the same "importance." For example, in a combat game between avatars, a user's avatar is could be designated a more "important" object than a background landscape object. In another example, a space ship needs to dodge certain asteroids in order not to be eliminated, and the individual asteroids are designated "important," for example, because of the influence wielded on the outcome of the game.

It is appreciated that larger graphics objects are not necessarily more important than smaller graphics objects.

In one example, if the multi-video output rendering engine 316 receives data indicative of a low screen resolution, certain objects will not be rendered by the output rendering engine 316 (for example, less "important" objects)(or will be rendered, for example, with less contrast or fewer colors) into the rendered video 116.

In exemplary embodiments, when rendering (by a single output or multi-output rendering engine) in the server array (i.e. 'on the server') in accordance with respective data indicative of the display characteristics of the respective target client device, one or me of the following may be carried out (any combination of the following):

a) selecting a color of the graphics object in accordance with the target client device display characteristics. Thus, in one example, a "sophisticated" client display displays a given object as pink (i.e. and rendered video for the sophisticated client display is generated with the object being pink), while for a more primitive display device with a screen for which it is more difficult to discern details, the object is rendered as a red object because red is easier for a user to see.

b) selecting an object size (i.e. relative to the screen size—i.e. the "proportional size") of the graphics object in accordance with the target client device display characteristics. Thus, in one example, a "sophisticated" display displays a given object as proportionally small (i.e. and rendered video for the sophisticated client display is generated with the object being proportionally small), while for a more primitive display device with a screen for which it is more difficult to discern details, the object is rendered as proportionally larger object because is easier for a user to see the larger object.

c) selecting a location of the graphics object in accordance with the target client device display characteristics. Thus, in one example, a "sophisticated" client display displays a given object an object at the edge of the screen (i.e. and rendered video for the sophisticated client display is generated with the object being at the edge of the screen), while for a more primitive display device with a screen for which it is more difficult to discern details, the object is rendered closer to the screen center because is easier for a user to see.

d) effecting a display decision of whether or not to display (or not to display) the graphics object in accordance with target client device display characteristics (i.e certain objects are only rendered for video designated for more sophisticated devices, while more primitive devices would not display the object at all in order to reduce the number of decisions);

e) effecting a dimensionality display decision for said graphics object in accordance with target client device display characteristics (for example, for a more sophisticated display device the object is rendered in 3D and for the more primitive display device the object is rendered in 2D)

f) effecting an internal detail display decision for said graphics object in accordance with target client device display characteristics (for example, for more sophisticated devices, certain internal details of the object are displayed and video is rendered accordingly, while for more primitive device, fewer internal details of the object are displayed and video is rendered accordingly—in one example, a person is shown "abstractly" on the primitive device while the more sophisticated device shows certain internal details of the person (for example, fingernails, eyebrows, etc);

g) location of an object on the screen (i.e. within the frame);

h) video overlay;

It is note that the aforementioned discussion of rendering objects in accordance to device display characteristics is relevant both for static graphical objects as well as for moving graphical objects for "user-controlled objects" controlled by a user as well as "machine-controlled objects" controlled by a the machine.

In exemplary embodiments, a "primitive display" typically refers to a display with a smaller screen, and a more sophisticated display typically refers to a display with a larger screen. Nevertheless, embodiments where parameters other screen size determine "primitiveness" or "sophistication" of a display device are also contemplated.

Typically, the most important parameter for determining if a client device is 'primitive' device (and/or has a primitive display) or is 'sophisticated' is display screen size.

Providing Data Indicative of Respective Client Device Display Characteristics to the Multi-Video Output Rendering Engine 316

There are a number of techniques for providing data indicative of client device display characteristics to the multi-video output rendering engine 316. In exemplary embodiments, combinations of various techniques may be used.

In some embodiments, streamer 352, in communication with client device 112, detects the display characteristics and/or target screen capabilities of the device. For example, upon session initiation (including but not limited to session initiation protocol (SIP), H.323, RTSP (real time streaming protocol).

Alternatively or additionally, this data may be available from an external database. In one example, a query is sent to a database of the telephone service provider.

Alternatively or additionally, an "internal database" may be maintained containing data indicative of client device display characteristics for a given user or subscriber.

Alternatively or additionally, an ad-hoc query may be sent to the client device. For example, a communications protocol between the server array 110A and the client device 112 may include a query sent to the cent device of device display characteristics.

Additional Discussion About Rendering in Accordance with Device Characteristics

As target screen's size is reduced, either in area or in color depth, the picture details are usually reduced proportionally. We propose to reduce the size or contrast of some (important) details less than the overall reduction. Other (very unimportant) details could be reduced more than the overall reduction, even to extinction. Some details like brightness can be increased.

Some reduction actions could be done a-priori, prepared for certain types of target screens.

Providing more detailed or less detailed picture can be implemented in a number of ways. In some implementations, data indicative of "object importance" is stored in the common data repository 314. According to this example, the multi-vide output rendering engine 316 has a threshold of 'object importance' required in order to render a given object into the rendered video stream 116. For a given video stream, this threshold may vary in accordance with the target device's display characteristics. Thus, for a "sophisticated" display device, the minimum 'object importance' required may be relatively low, allowing for more objects to be rendered than for a 'primitive' display device, where the minimum object importance threshold may be higher.

According to another example, the contrast for a rendered object may be determined in accordance with an 'object importance' score stored in the common data repository 314 and the data indicative of device display characteristics.

Potential Benefits Provided by Exemplary Embodiments

The method enables getting a picture on an inferior screen while keeping the important details visible. Moreover, as the target screen is changed, picture could be re-adjusted to include more or less (important) details. User will get the best visual service that can be done. Due to personal calculation for every player, a game with different types of handsets can be performed and even a user can change its handset during a session and still get the right video to support best (rendered video) available quality.

This functionality will eliminate the need for creating new version for every game for the purpose of porting a PC game to Cellular devices.

Additional Techniques of Providing an Electronic Gaming Environment

Throughout this disclosure, it is noted that each client device may be associated with a respective gaming character. It is noted that, during the course of the game, the gaming character associated with a specific client device may change. In one example, the game is a single player or multi-player soccer game, and gaming characters are soccer players. At one point, a certain user's gaming device may be associated with one specific gaming character (a particular soccer player, such as a goalie). At a later stage in play, certain user's gaming device may be associated with a different specific gaming character (for example, an attacker). This "association switch" may be triggered, for example, in accordance with a user request, or by the gaming engine (for example, in accordance with the position of the ball on the field).

System and Method for Providing Programming for Spectators

There is an ongoing need for new types of television programming.

Television broadcasts (distributed through television distribution channels and/or over the Internet and/or over a "TV phone") of competitive events are well known in the art. For example, millions of viewers every day watch various sporting events on their televisions. These sporting events are usually pre-scheduled and presented as part of an "entertainment package" or "show format" to the viewers. Typically, the identities of the competitors of the sporting event are publicly disclosed before the event in order to draw viewers. Typically, competition is paused at periodic intervals in order to broadcast various commercial messages. After each commercial message, broadcast competition is resumed.

The present inventor is now revealing for the first time that it is useful to make available one or more views of the virtual gaming universe (of a single player and/or multi-player game) to one or more spectators. In some embodiments, specific games may have a specific starting time and/or ending time which is pre-scheduled and made available to spectators and/or prospective spectators, though this is not a limitation.

In some embodiments, there is an announcer (for example, a voice announcer) who announces to spectators information about events that transpire in the virtual universe (for example, the "virtual" first national bank has been robbed, or "Derek Jeter his a home run") In one example, the user can control whether or not an audio announcer is provided, or configure properties of this audio announcer. In one example, there may be different audio announcer "personalities" (for example, a Howard Cossell personality, a Jon Madden personality, etc).

Thus, it is now disclosed for the first time a system for providing and/or distributing this programming (i.e. video and optionally and preferably audio of multi-player games) to spectator viewers, and methods and computer-readable code for providing the same. Thus, the "spectator" is provided with one or more views of the virtual universe.

More specifically, it is disclosed that single-player or multi-player video games (for example, "low latency single-player or multi-player video games") may be broadcast and/or distributed (for example, as "television programming", over the internet, radio broadcast, distribution over a telephony system, cable or any other means) to a plurality of viewers. In some embodiments, the identities of the competitors (either the virtual gaming characters and/or the human users controlling the game characters) of the sporting event are publicly disclosed before the event. In some embodiments, the single multi-player video game competition may be "paused" for commercial messages, and resumed after the commercial messages.

There is no limit on the single or multi-player gaming system used to provide the virtual universe. In some embodiments, this multi-player gaming system is a gaming system disclosed herein, though other embodiments are contemplated. In some embodiments, this multi-player gaming system is a "low latency system" for example, a low latency system where players and/or spectators are physically distributed over a wide geographic region or communicate through a wide "network" region. Alternatively or additionally, one or more players and/or spectators may be situated substantially in a single geographic and/or network location.

In some embodiments, spectators are charged a price to view the game or advertisers are charged a price to present messages associated with a particular game. This price may be computed in accordance many factors, such as the type of game, the players of the game (either gaming characters such as avatars or in accordance with the human users controlling the gaming characters).

In some embodiments, the spectators are passive and are only provided with a view of the virtual gaming universe without the ability to influence events within the gaming universe (for example, without the ability to control gaming character). Alternatively and optionally, the spectators are provided with a mechanism for exerting control limited in some degree (usually an "indirect" control via the players, but also there is a possibility of direct control) over the "physical" events within the game universe.

In some embodiments, this is a "service" (for example, a pay service or a free service) that may be available "on demand" instead of at a pre-determined time.

In some embodiments, the participants (competitors) are located in a single location. Alternatively, they may be dispersed at a number of locations, for example, in different cities or different countries. Both individual competition as well as competitions with teams may be used. In some embodiments, there is no "competition" per se.

In some embodiments, individual players may participate using a traditional "computer" as a client device. Alternatively or additionally, individual players may participate using a mobile device (i.e. telephone and/or PDA) as a client device.

In some embodiments, league competition or tournament competition may be broadcast.

Thus, in some embodiments, a particular "spectator interface" allowing the spectator to choose view properties or other properties is provided.

Spectator or "Fan" Influence on Events of Within the Virtual Universe

In the real world it is noted that fans who attend a live event (for examples, fans who attend a football game or hockey game in a physical arena on a "real" gridiron of grass or a "real" ice rink) may have some limited control over the movement of the players and/or over events that transpire within the game. For example, spectators may encourage a player to exert himself to a greater extent, thus "psychologically" increasing the resources (i.e. strength, stamina) available to that player. Alternatively, spectators may "root against a player" concomitantly decreasing the resources available to the player.

In another examples, fans may pass important information to the players of a game or event. For example, the fans may reveal to a player or team the movements of an opponent or may other may reveal the existence of other conditions or events within the game or relevant to the game (for example, a warning that a certain patch of grass is slippery, etc). Similarly, fans (for example opposing fans) may reduce the amount of information available to a player, either by disseminating "misinformation" to a player (for example, instructing a baseball player to swing at a bad pitch) or by distracting the player (for example, making a lot of noise so team players cannot hear each other).

The aforementioned examples relate to the case where a spectator may "indirectly" influence events within the game. In many examples, however, the fan may "directly" generate events within the physical game universe. For example, a player may throw a bottle on the field, or may run out onto the field generating an "interference"-like event. In one famous example, in 2003, Cubs fan Steve Bartman, situated near the perimeter of the playing area (i.e. in the "stands"), deflected a foul ball off making the ball uncatchable.

The present inventor is now disclosing, for the first time, that this concept of fan influence may be adopted for and generalized to the virtual gaming universe. Thus, in some embodiments, video game "spectators" viewing a game through a video screen of a client device may influence events within the gaming universe, for example, may modify an "intrinsic" property of one or more players (for example, strength, stamina, etc), and/or may increase or reduce the amount of information available to all players or a specific players or a specific group of players.

In some embodiments, the fan or spectator may be associated with a certain physical position or region outside of the "official" region of play (virtual "stands"). Thus, in one example, certain players in one region of the "stands" may pass information available only to players on the "game field" of the virtual universe in physical proximity (for example, in virtual "shouting region" of the position of the fan in the stands) to the fan within the "virtual stands" or "spectator region" of the gaming universe. Typically, the spectator is restricted to the "spectator region" though there are examples where a spectator may enter the "gaming region" (for example, a virtual fan "running out onto the field").

Thus, in some embodiments, different fans may have different abilities to influence events in the game (typically, to "indirectly" influence events, but not limited to indirect influence) depending in a respective position of the spectator or fan within the spectator region.

It is noted that the concept of "fan influence" is not a limitation of the present invention, and embodiments where the fans are "purely passive" spectators with no influence over what transpires within the virtual universe are also contemplated. In some example, a certain limited group of fans are afforded more influence than other fans (who are allow less influence or no influence). The physical analogue of this situation is a baseball game where the spectators with the "good seats" are in "direct proximity" of the playing field and can wield more influence (through stronger "cheering," passing information that will be heard by players, direct interference) while players with "inferior seats" (for example, a higher level within the stands) are afforded less influence.

Thus, embodiments where certain fans may "buy" more influence than other fans are also contemplated. This influence may be purchased by effecting a payment, of "real cash" or its equivalent (i.e. digital cash, credit card, etc) or by payment of other types of "points."

In some embodiments, the players of the video game may participate sequentially, rather than in head to head competition. One example would be virtual figure skating.

In some embodiments, the spectators may rate (or vote on) various qualities of the game players (for example, qualities of a virtual swimming pool diver or figure skater). In some embodiments, this may be done in accordance with a "pay model" where spectators who pay more are afforded more "votes" or a more sophisticated "rating influence."

In some embodiments, the system is configured (or a method or code is provided) to allow spectators to gamble on various outcomes of the multi-player game or virtual universe. In some embodiments, various "odds" may be updated, for example, in real time, in accordance with events of the multi-player game.

Figure 12:
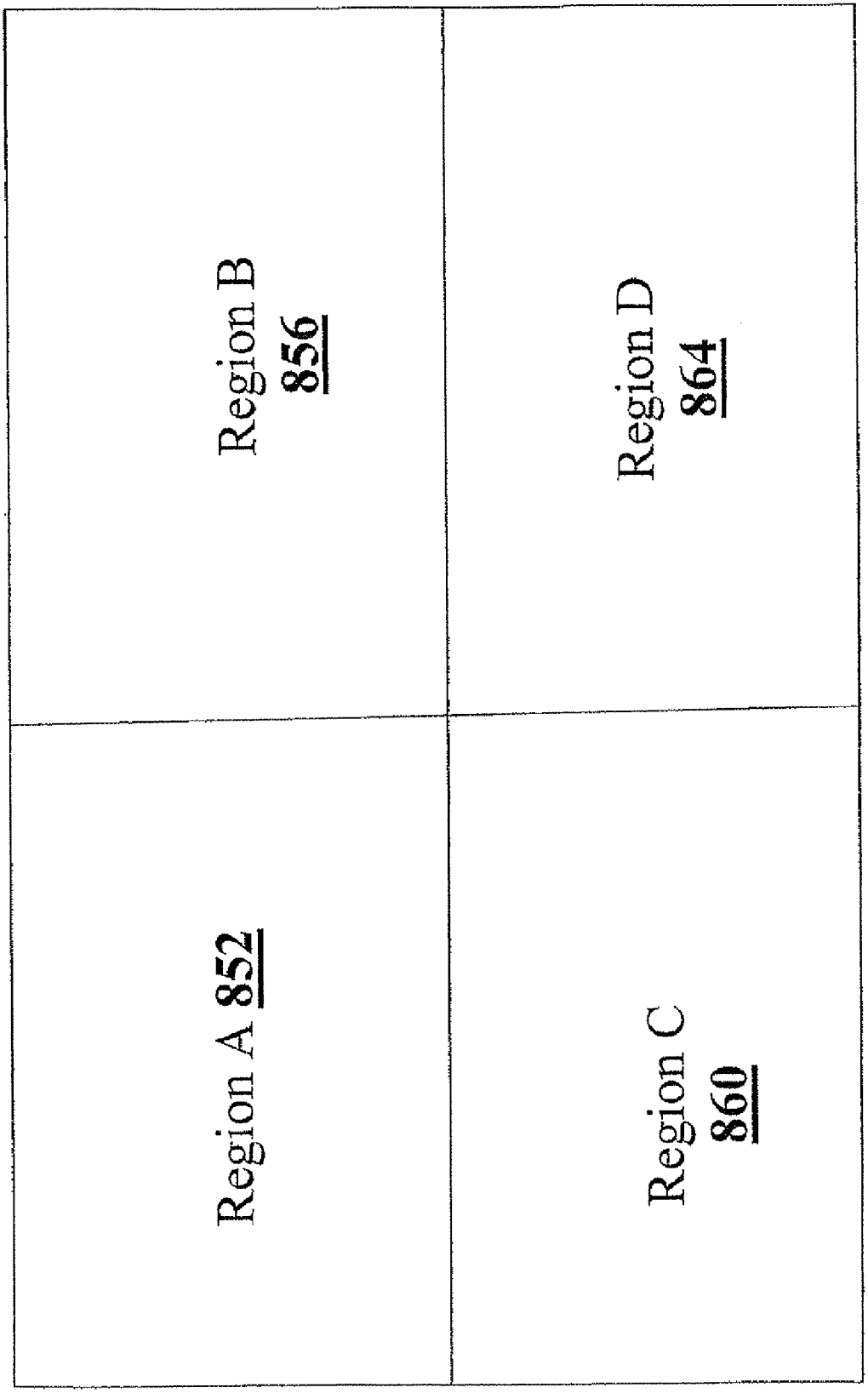
FIG. 12 provides on example of how to divide a video frame into a plurality of sub-regions.

Exemplary Techniques for Encoding and/or Decoding and/or Transmitting Electronic Video Content
Discussion of FIGS. 12; 13A-13C

As noted in the background section of the present disclosure there is an ongoing need for improved techniques for encoding and/or decoding electronic video content.

It is noted that decoding and displaying the pictures requires a certain amount of computational resources. Typically, handling of I frames is more resource intensive than handling of B or P frames. When the decoder periodically receives an I frame, there thus may be a periodic "spike" in the amount of computational resources required to handle the I frame. During the time that P frames (or other "light frames" representing changes in an image rather than the entire image), the amount of computational resources required could be less. There is an ongoing need for methods and systems for stabilizing, in time, the amount of resources needed to decode and/or encode video.

According to some embodiments, instead of sending only 'full' I frames and 'full' P frames, it is possible to send 'spatially partial I frames' that in some locations have I frame data and in other locations have other than I frame data. In the example of FIG. 12 and FIG. 13A-13C the 'spatially partial' I frames (or 'partial I frames') are generated by breaking up a given I frame into a plurality of I frames by "splitting" the I frame into different constitutive pieces. Each piece are frame including a partial I frame may be sent over a network. Because the size of each piece is smaller than the size of the original I frame, the amount of resources (for example, computational and/or network resources) required to handle each frame comprising a spatially partial I frames) may be less than the amount of resources required to handle the 'original' I frame before splitting into 'pieces.'

In one non-limiting example, the screen is divided into four different regions (see FIG. 12). A first I frame limited only to data of region A 852 is then sent. Afterwards, a second I frame 856 limited only to data of region B is sent. Afterwards, a third I frame limited only to data of region C 860 is sent. Afterwards, a fourth I frame limited only to data of region D 864 is sent.

Figure 13A:
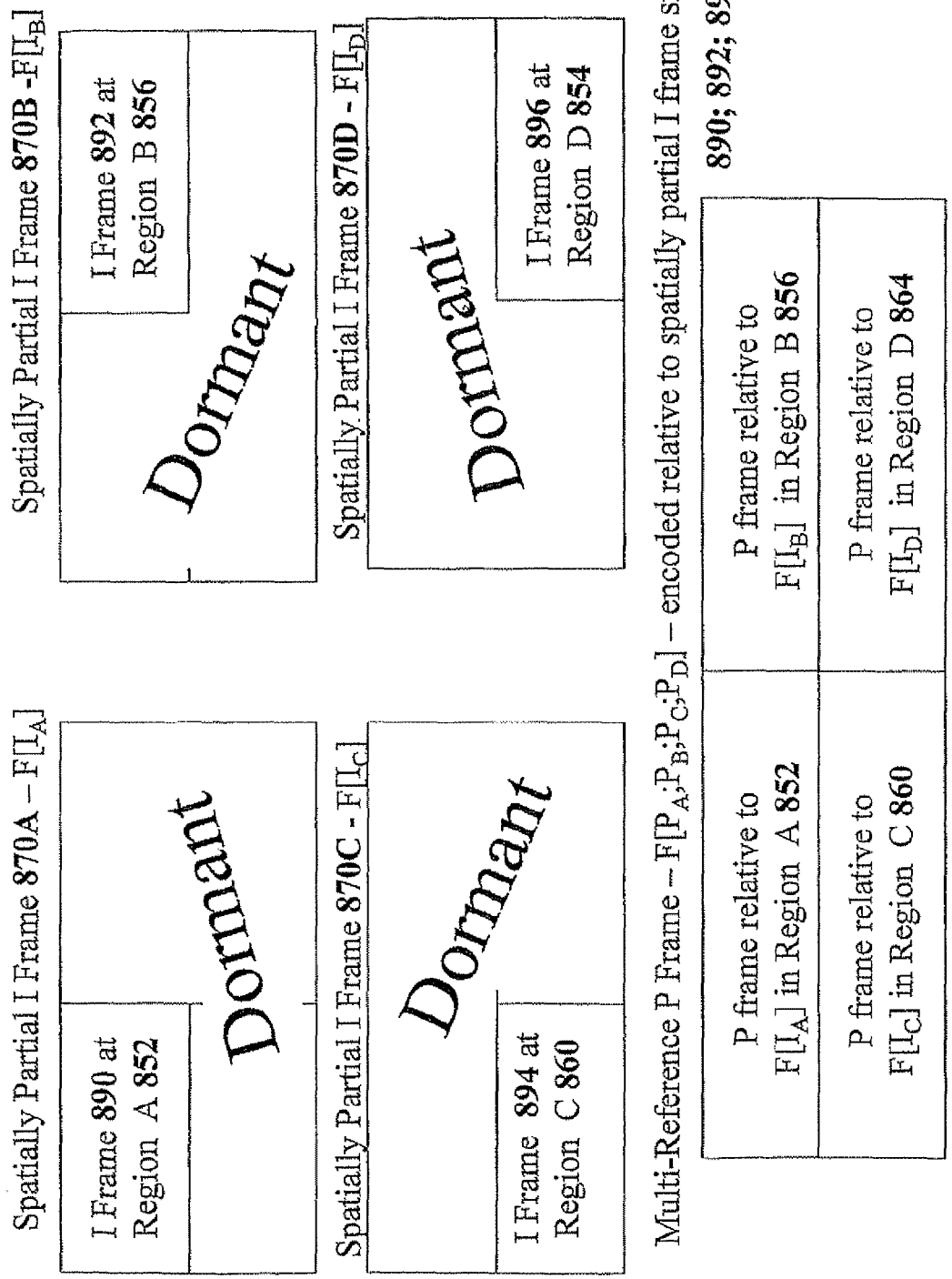
FIG. 13A describes exemplary spatially partial I frames.

FIG. 13A provides an illustration of exemplary 'spatially partially' I frames or partial I frame. Frame 870A is an I frame 890 in region A 852 but is 'dormant' in other regions (i.e. does not provide video data). Frame 870A is an I frame 890 in region A 852 but is 'dormant' in other regions (i.e. does not provide video data). Similarly, frame 870B is an I frame 892 in region B 8526 but is 'dormant' in other regions (i.e. does not provide video data), and so on.

For the present section, and for the present example of dividing the frame or screen into four regions (as device in FIG. 12), the following notation is defined for a given frame: the frame is described as F followed by a square bracket. If, for a given frame, if within the square bracket the letter "I" appears with a subscript, the given frame is at least partially an I frame. In particular, the frame is partially an I frame in the region (i.e. A-D) of the subscript. It is noted that the frame can be partially an I frame in more than one region specified in the square brackets.

In a given generated sequence of video frames (for example, generated by encoding 'input' frames), after one or more I spatially partial I frames it is possible to provide one or more at least spatially partially P frames encoded relative to spatially partial I frame. At the bottom of FIG. 13, there is illustrated a multi-reference P frame that includes: a P frame portion encoded relative to distinct at least partially spatially I frames. For the present disclosure, for a given frame, if within the square bracket the letter "P" appears with a subscript, the given frame is at least partially an P frame. In particular, the frame is partially a p frame in the region (i.e.

A-D) of the subscript. It is noted that the frame can be partially an P frame in more than one region specified in the square brackets.

At the bottom of FIG. 13A, an illustration of a so-called multi-reference P frame is provided—in contrast with 'conventional' P frames which are encoded relative to a single I frame (and optionally one or more previous P frames that succeed the single I frame), the multi-reference P frame are encoded relative to multiple I frames (in the example of FIG. 13A, all of 870A; 870B; 870C; and 870D (and optionally one or more P frames that come after the I frame).

Figure 13B:
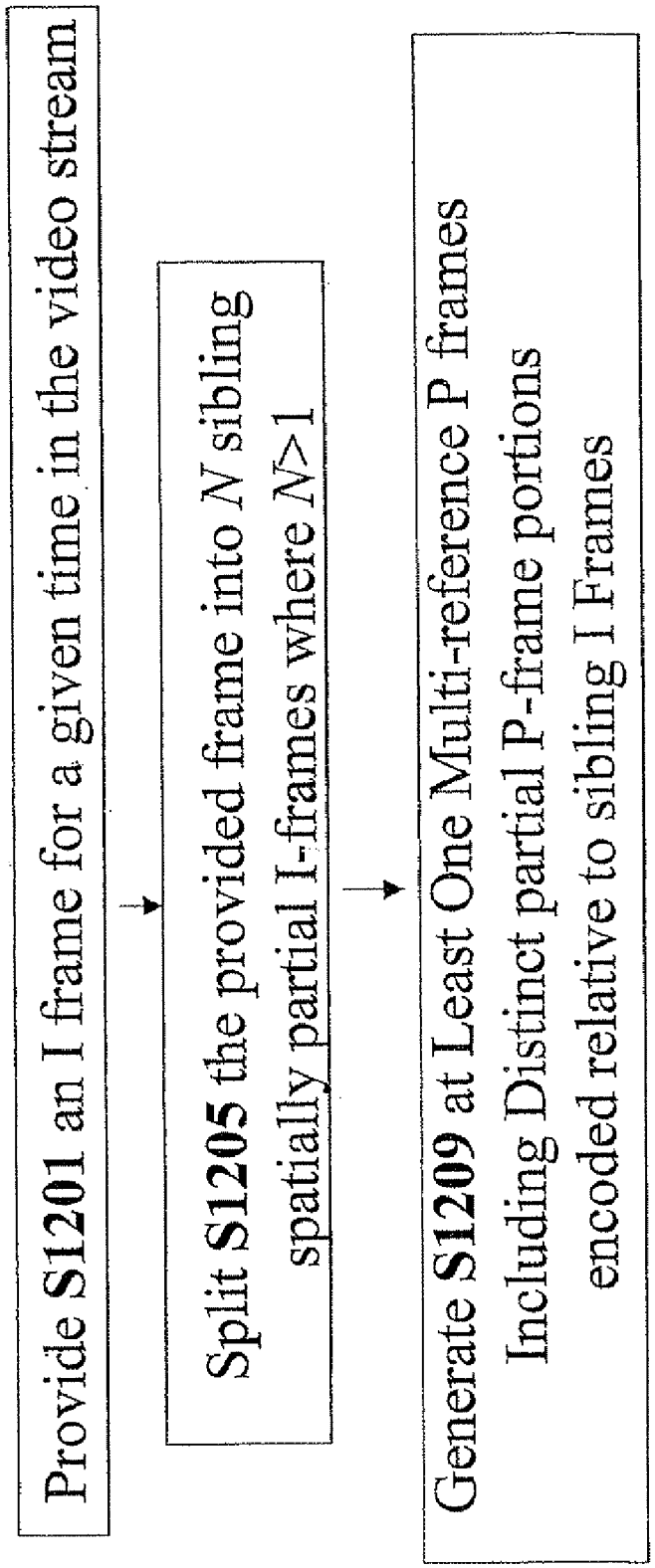
FIG. 13B describes a technique for splitting an I frame into a plurality of spatially partial I frames.

FIG. 13B provides a flow chart of an exemplary techniques for 'splitting' a single I frame into multi-I frames. By breaking up the 'heavy' I frame, this may be useful for 'smoothing' the amount of computer resources (i.e. CPU and/or network) for handling the heavy I frames.

For the present disclosure, the partial I frames obtained by splitting an input partial or complete 'input' I frame (for example, in steps S1201-S1209) are referred to as 'siblings' of each other since they originate from the same 'input frame' (i.e. in a single location in the 'input frame' ordered sequence)

FIG. 13C provides a description of an exemplary ordered sequence of I frames and P frames according to the technique of FIGS. 13A-13B. Thus, after providing in the sequence partial I frames for all 4 regions (i.e. 1510-1522) an uninterrupted sequence of non-I frames (i.e. frames 1526-1534) is provided. It is noted that because frame 1530 is encoded relative to a previous P frame 1526 as well as still earlier partial I frames (i.e. frames 1510-1522), the constitutive partial P frames of frame 1530 are 'second generation'—i.e. encoded relative to and thus 'descending' from 'first generation' P frames (i. Constitutive frames of 1562). The generation of a given spatially partial P frame is denoted by the numerical superscript after the letter "P." The constitutive partial P frames of frame 1534 are 'third generation'.

It is noted that every frame of 1526-1534 is generationally homogenous—i.e. every P constitutive spatially partial P frame has the same superscript for each given frame.

Figure 14B:
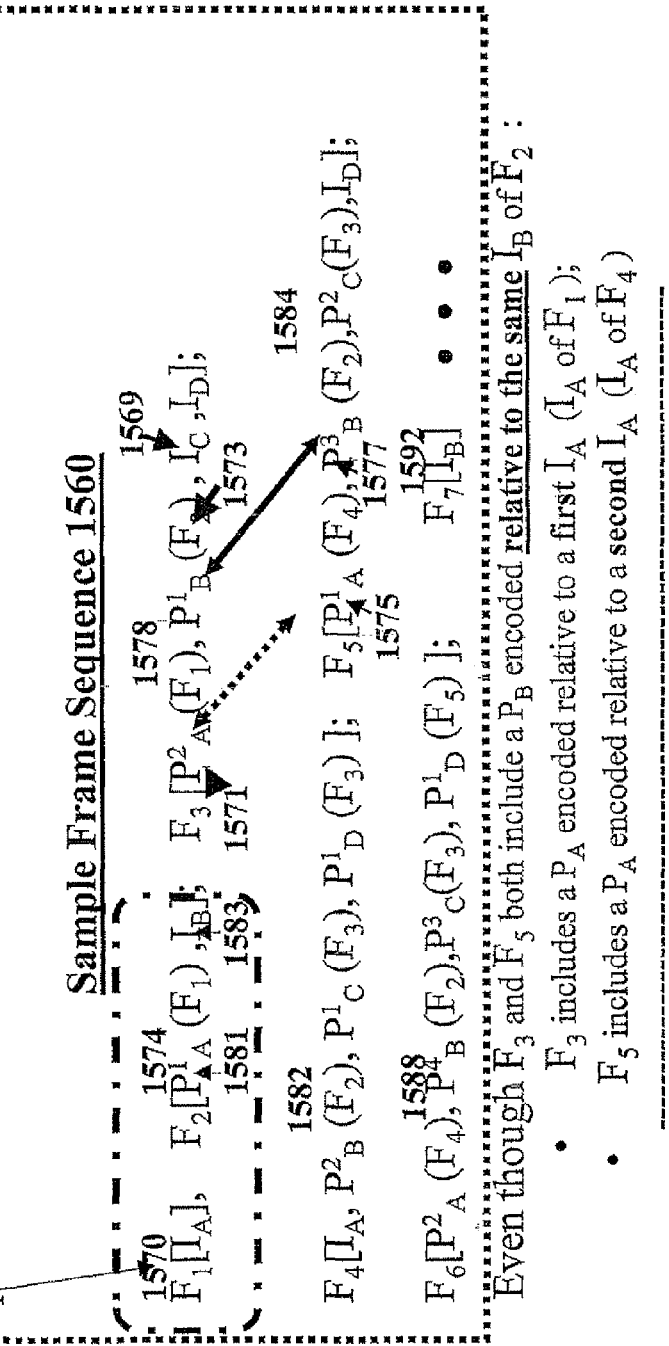
FIG. 14B describes, by example, a scheme for generating I frames and P frames where generationally-inhomogeneous partial or complete P frames are generated.

A Discussion of FIGS. 14A-14B

One shortcoming of the technique described in FIGS. 13A-13C is when the 'dormant' frames are handled, there are regions of the frame that are not updated. Thus, unfortunately, there may be a sacrifice of video quality.

The present inventor is now disclosing for the first time that it is partial to provide what is defined as hybrid frames (see FIG. 14A) where one portion of a given frame is a spatially partial P frame and another portion of the given frame is a spatially partial I frame.

It is noted that one salient feature provided by certain (but not all) hybrid frames is co-resident partial P frames that are encoded relative to different partial I frames that are not siblings of each other—one example of this is given in FIG. 14B (see, for example, frame 1578 of FIG. 14B which is includes a first constitutive spatially partial P frame 1571 encoded relative to partial I frame 1570 and a second constitutive spatially partial I frame 1573 encoded relative to partial I frame 1583—noted that partial I frame 1570 and a partial I frame 1573 are NOT siblings.

Instead, as illustrated in FIG. 16, partial I frame 1570 is derived from a first input frame 1670 and partial I frame 1574 is derived from a second input frame 1674—thus 1570 and 1583 are not siblings.

Another salient feature provided by some frames in FIG. 14B is that some frames (i.e. frames F3-F6) are not generationally inhomogeneous—note the presence of different P-generation subscripts within the same frame as opposed to FIG. 13C.

Figure 15:
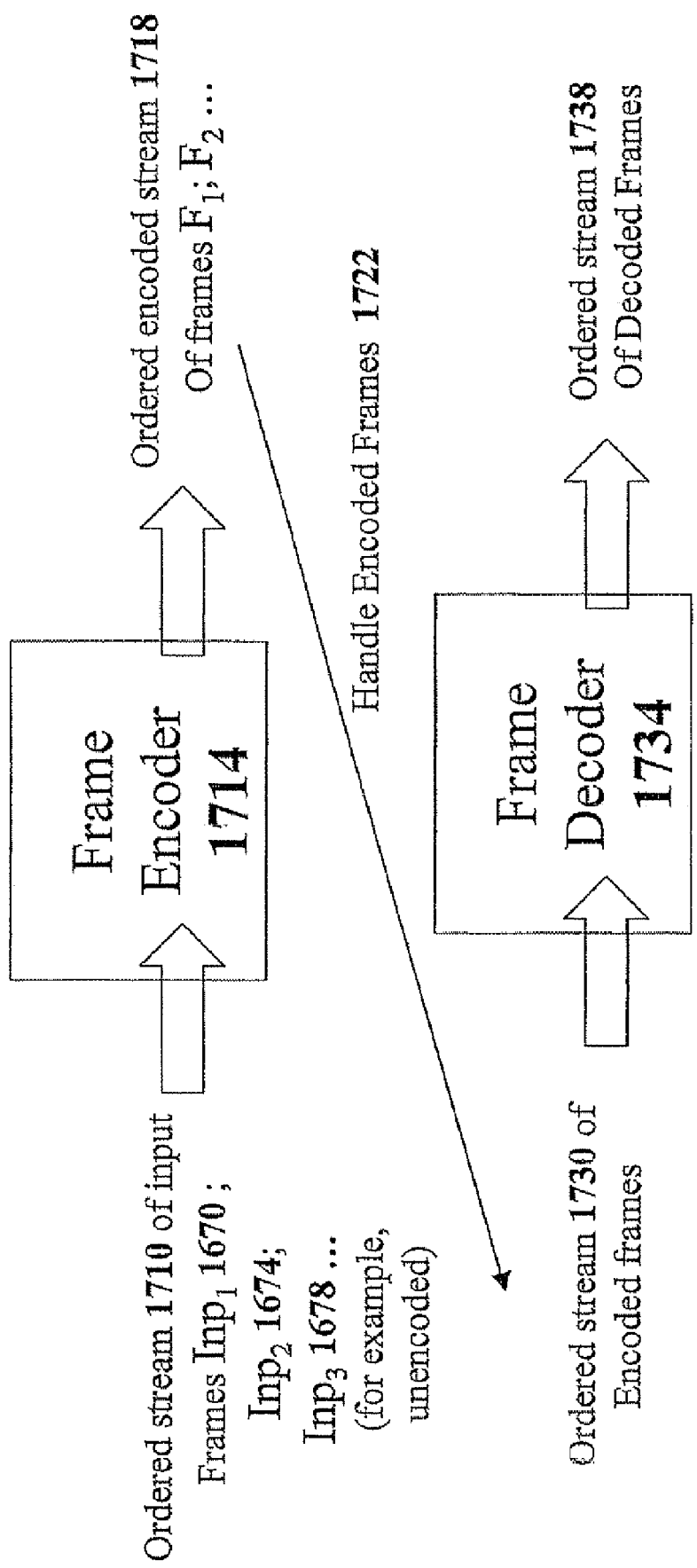
FIG. 15 describes an exemplary technique for encoding and decoding video frames.

In FIG. 15, it is noted that an ordered sequence 1710 of frames may be encoded using hybrid P-frames-I frames are generationally inhomogenous at least partially P frames. This may be carried out using a frame encoder 1714 implemented using any combination of hardware and/or software.

In the present disclosure, any described element or component may be implemented using any combination or hardware and/or software.

The ordered sequence of encoded frames 1718/1730 of encoded frames may be decoded by a frame decoder 1734 as shown in FIG. 15.

Additional Discussion Relating to FIGS. 13-16

It is appreciated that this concept may be generalized—the frame may be split into any number of regions, of any shape. It is important to stress that non-contiguous regions and/or contiguous regions are both appropriate In some embodiments, an area of a region for a partial I frame is at least 10% and at most 50% of the area of the frame, though this is not a limitation.

Thus, any defined method for the frame splitting may be used, including but not limited to square by square in the way that each "partial frame" includes lines from up to bottom and from left to right. Alternatively or additionally, each partial frame can include information of a dilute picture e.g. every tenth pixel in a given row or column for a given partial I frame. According to this example, different partial I frame would use different pixels of the "dilute picture."

It is noted that, in some examples, the presently disclosed "partial I frames" may be sent in the same video sequence as "full I frames."

According to some preferred embodiments, during very slow video (i.e. when the P frames are not "heavy" and when handling the P frames is not resource intensive) we transfer can transfer more complete the I-frames (for example, example, whose regions is a greater portion of the entire frame). During "faster video" (i.e. when there are more changes per frame, and the P frames are "heavier"), less "complete" I frames may be sent (i.e. covering a less portion of the entire frame). This allows for the "smoothing" of computing resources (i.e. computational resources and/or network resources).

In some embodiments, the frames are 'dynamic frames'—the borders by the partial P portions and/or partial I portions and/or dormant portion are not 'fixed' as in FIGS. 13-15 but change in 'time' (i.e. between frames and are thus dynamic). In one example, criteria for deciding which objects in the video are 'important' are established and regions where this object is located may be preferentially designated as partial I frame regions—i.e. even if this object is of arbitrary and possibly non-constant shape and even if this object 'moves' between frames and 'over time.'

Though not a limitation, it is noted that in some embodiments, this presently disclosed technique may be useful in a constant bit rate transfer network. In particular, in such networks spikes in required bandwidth associated with "heavy" I frames may be problematic, and the solution presented herein may be helpful for smoothing required bandwidth.

Not wishing to be bound by theory, one or more advantages may include, in some embodiments, controllable bit rate and/or graduated recovery process.

Discussion of FIG. 17

In some embodiments, video encoding using a presently-disclosed technique for encoding video is sent to a client device 112 (for gaming video or any other video other than gaming video—for example, 'movies'). Unfortunately, the client device 112 which includes a host 1400 (for example, a mobile telephone or any other host device) may not be capable of decoding the video using the onboard CODEC(s) (i.e. typically implemented in hardware).

Thus, it may be problematic to reconfigure the host 1400 (i.e. to include the appropriate CODEC(s) so that the media player 1412 may carry out a technique for decoding video frames disclosed herein) to decode electronic video content encoded using a presently-disclosed technique.

Towards this end, a technique is disclosed in FIG. 17 so that a host device (i.e. not operative to decode video) may, when coupled to a presently disclosed novel peripheral device, nevertheless (i) receive S1451 video (by a receiver 1404 of the host); (ii) decode S1466 video (i.e. by the peripheral device 1410 which includes an onboard CODEC(s) for decoding video as disclosed herein; and (iii) playback decoded (or alternatively, re-encoded video derived from the decoded video and encoded using a scheme recognizable by media player 1412).

It is noted that the host device 1400 is capable of communicating with a flash memory card or other peripheral using a 'standard' device protocol—for example, a USB, MMC or SD-type protocol.

Thus, the peripheral 1410 device may 'fool' the host 1400 by presenting itself as a 'standard' peripheral device recognizable by host 1400—for example a flash memory card.

On the host 1400 resides a 'standard' application 1408 which attempts, using the standard flash memory card protocol, to send S1454 the received video stream to the 'flash card' (for example, using a 'stream send' or 'file save' command). The host 1400 may be completely ignorant of what transpires on the peripheral 1410 device and 'believes' that it is (for example, using 'standard' software application 1408): (i) sending S1454 digital content (i.e. as a stream and/or file) to the coupled 'flash card'; (ii) retrieving and playing back S1478 the 'saved' media content (i.e. either not encoded or encoded using a 'standard' protocol).

Within the peripheral, behind the 'flash memory card interface,' the device may decode (i.e using a presently disclosed technique for decoding media content) the received video content as described in FIG. 17.

Thus it is now possible to enable 'standard' host devices to implement this technique for decoding video content even if there is no access to modify the media player 1412 to carryout a presently disclosed technique for decoding video content.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A server-based system for providing gaming services, the system comprising:
    a) an application server array 110 adapted to receive, from at least one client device 112, data 118 indicative of game commands; and
    b) a game engine 312 residing at least in part on said application server array 110 for maintaining a virtual gaming universe including at least one user-controllable gaming character 816, said gaming engine operative to associate a given said gaming character 816 with game commands of a given said client device 112, said game engine 312 being operative to generate snapshots of said virtual gaming universe, said game engine 312 being operative to:
        i) derive, from a first said snapshot 2100 associated with a first game time $t^g_0$ 2102 and a first game command set $c_1$ 2104, a second snapshot 2200 associated with a second game time $t^g_1$ 2202 and a second game command set $c'_1$ 2204; and
        ii) derive, from said first snapshot 2100, a third snapshot 2110 associated with a third game time $t^g_2$ 2122 and a third game command set $c_2$ 2114,
    wherein:
        i) $(t^g_2 - t^g_0) <= (t^g_1 - t^g_0)$;
        ii) said third game command set $c_2$ 2114 includes at least one extra game command relative to said second game command set $c_1$ 2104;
        iii) said game engine is operative such that said deriving of said second snapshot 2200 includes:
            A) predicting a future state 816B of said given user-controllable gaming character 816 for said second game time $t^g_1$2202, said future state 816B being different from a current state 816A of said given user-controllable gaming character;
            B) predicting a future state 810B of at least one object 810 in said virtual gaming universe other than said given user-controllable gaming character 816 for said second game time $t^g_1$2202;
            C) computing a relationship between said predicted future states 816B and 810B.

2. The system of claim 1 further comprising:
    c) a data streamer operative to send said second snapshot to said client device associated with said gaming character.

3. The system of claim 2 wherein said third snapshot contradicts said second snapshot according to game logic of said game engine 312, and said game data streamer is further operative, after said sending of said second snapshot to said client device, to send to a derivative of said contradictory said third snapshot to said client device 112.

4. The system of claim 1 wherein said game engine 312 is operative to associate each said 112 client device of a plurality of client devices with a respective said gaming character, and to derive, for said respective gaming character, a respective said second snapshot from said first snapshot.

5. The system of claim 2 further comprising:
   c) a data streamer operative to send to said each client device 112, said second respective snapshot associated with said respective gaming character.

6. The system of claim 5 wherein said third snapshot contradicts said respective second snapshot according to game logic of said game engine 312, and said game data streamer is further operative, after said sending of said second snapshot to said client device, to send to a derivative of said contradictory said third snapshot to said client device 112.

7. A method for providing gaming services, the method comprising:
   a) receiving, at an application server array 110 from at least one client device 112, data 118 indicative of game commands; and
   b) maintaining, on said application server array 110, a virtual gaming universe including at least one user-controllable gaming character 816 such that a given said gaming character 816 is associated with game commands of a given said client device 112; and
   c) generating snapshots of said virtual universe, wherein said generating includes:
      i) deriving, from a first said snapshot 2100 associated with a first game time $t^g_0$ 2102 and a first game command set $c_1$ 2104, a second snapshot 2200 associated with a second game time $t^g_1$ 2202 and a second game command set $c'_1$ 2204; and
      ii) deriving, from said first snapshot 2100, a third snapshot 2110 associated with a third game time $t^g_2$ 2122 and a third game command set $c_2$ 2114,
   wherein:
      i) $(t^g_2 - t^g_0) <= (t^g_1 - t^g_0)$;
      ii) said third game command set $c_2$ 2114 includes at least one extra game command relative to said second game command set $c_1$ 2104;
      iii) said game engine is operative such that said deriving of said second snapshot 2200 includes:
         A) predicting a future state 816B of said given user-controllable gaming character 816 for said second game time $t^g_1$ 2202, said future state 816B being different from a current state 816A of said given user-controllable gaming character;
         B) predicting a future state 810B of at least one object 810 in said virtual gaming universe other than said given user-controllable gaming character 816 for said second game time $t^g_1$ 2202; and
         C) computing a relationship between said predicted future states 816B and 810B.

\* \* \* \* \*